United States Patent [19]

Lee et al.

[11] Patent Number: 5,387,339
[45] Date of Patent: Feb. 7, 1995

[54] HIGH EFFICIENCY LIQUID FILTRATION SYSTEM AND METHOD FOR USING THE SAME

[75] Inventors: Sun Y. Lee, Arvada; Edward R. Lappin, Golden, both of Colo.

[73] Assignee: Coors Brewing Company, Golden, Colo.

[21] Appl. No.: 168,954

[22] Filed: Dec. 17, 1993

[51] Int. Cl.$^6$ .......................................... B01D 33/073
[52] U.S. Cl. ................... 210/326; 210/330; 210/329; 210/360.2; 210/323.2; 210/321.89; 210/497.01
[58] Field of Search .................. 210/780, 784, 321.68, 210/321.87, 321.89, 321.9, 323.2, 326, 325, 330, 360.2, 369, 497.01, 329; 209/303, 304, 270; 422/101; 436/178

[56] References Cited

U.S. PATENT DOCUMENTS

| | | |
|---|---|---|
| Re. 30,845 | 1/1982 | Ossona de Mendez et al. . |
| 781,107 | 1/1905 | Stewart . |
| 2,442,234 | 5/1948 | Dunmire . |
| 2,670,849 | 3/1954 | Dunmire . |
| 3,241,676 | 3/1966 | Neuville . |
| 3,311,235 | 3/1967 | Ahlfors . |
| 3,338,416 | 8/1967 | Barry . |
| 3,363,771 | 1/1968 | Walters . |
| 3,491,887 | 11/1970 | Maestrelli . |
| 3,821,108 | 6/1974 | Manjikian . |
| 3,926,733 | 12/1975 | Chibata et al. . |
| 4,385,113 | 5/1983 | Chappelle et al. . |
| 4,591,445 | 5/1986 | Spinell et al. . |
| 4,676,951 | 6/1987 | Armes et al. . |
| 4,702,845 | 10/1987 | Wykoff . |
| 4,755,300 | 7/1988 | Fischel . |
| 4,790,942 | 12/1988 | Shmidt et al. . |
| 4,808,307 | 2/1989 | Fischel . |
| 4,842,722 | 6/1989 | Holz . |
| 4,860,379 | 8/1989 | Schoeneberger et al. . |
| 4,867,878 | 9/1989 | Rashev . |
| 4,871,462 | 10/1989 | Fischel . |
| 4,876,013 | 10/1989 | Shmidt et al. . |
| 4,906,379 | 3/1990 | Hodgins et al. . |
| 4,909,373 | 3/1990 | Drori . |
| 4,911,847 | 3/1990 | Shmidt et al. . |
| 5,000,848 | 3/1991 | Hodgins et al. . |
| 5,004,682 | 4/1991 | Roberts et al. . |
| 5,030,347 | 7/1991 | Drori . |
| 5,034,135 | 7/1991 | Fischel . |
| 5,160,633 | 11/1992 | Hong . |
| 5,200,074 | 4/1993 | Suzaki . |

FOREIGN PATENT DOCUMENTS

| | | |
|---|---|---|
| 62-273016 | 11/1987 | Japan . |
| 86106293 | 11/1986 | WIPO . |
| 92/06765 | 4/1992 | WIPO . |

*Primary Examiner*—Thomas M. Lithgow
*Attorney, Agent, or Firm*—Klaas, Law, O'Meara & Malkin

[57] ABSTRACT

A high efficiency, self-cleaning system for separating solid materials from liquids. The system includes a primary housing having at least one inlet and a plurality of cylindrical filter cartridges therein which are directly adjacent to and in close proximity with each other. The lower end of each cartridge is positioned on a spring-biased bearing member, with the upper end having an opening therein. Positioned within the opening and connected to each cartridge is a tubular shaft attached to a pulley-type motor drive system. The drive system is used to rotate the cartridges in a selected direction. In operation, fluids to be filtered enter the housing and come in direct contact with the rotating cartridges. Rotation of the multiple cartridges and close proximity of the cartridges to each other creates fluid turbulence within the housing. This turbulence scrubs collected solids from the cartridges and promotes fluid flow into the cartridges. Fluids collected within the cartridges pass into the tubular shafts and out of the system. As a result, the fluids are effectively filtered in a rapid and efficient manner while minimizing system down-time.

20 Claims, 6 Drawing Sheets

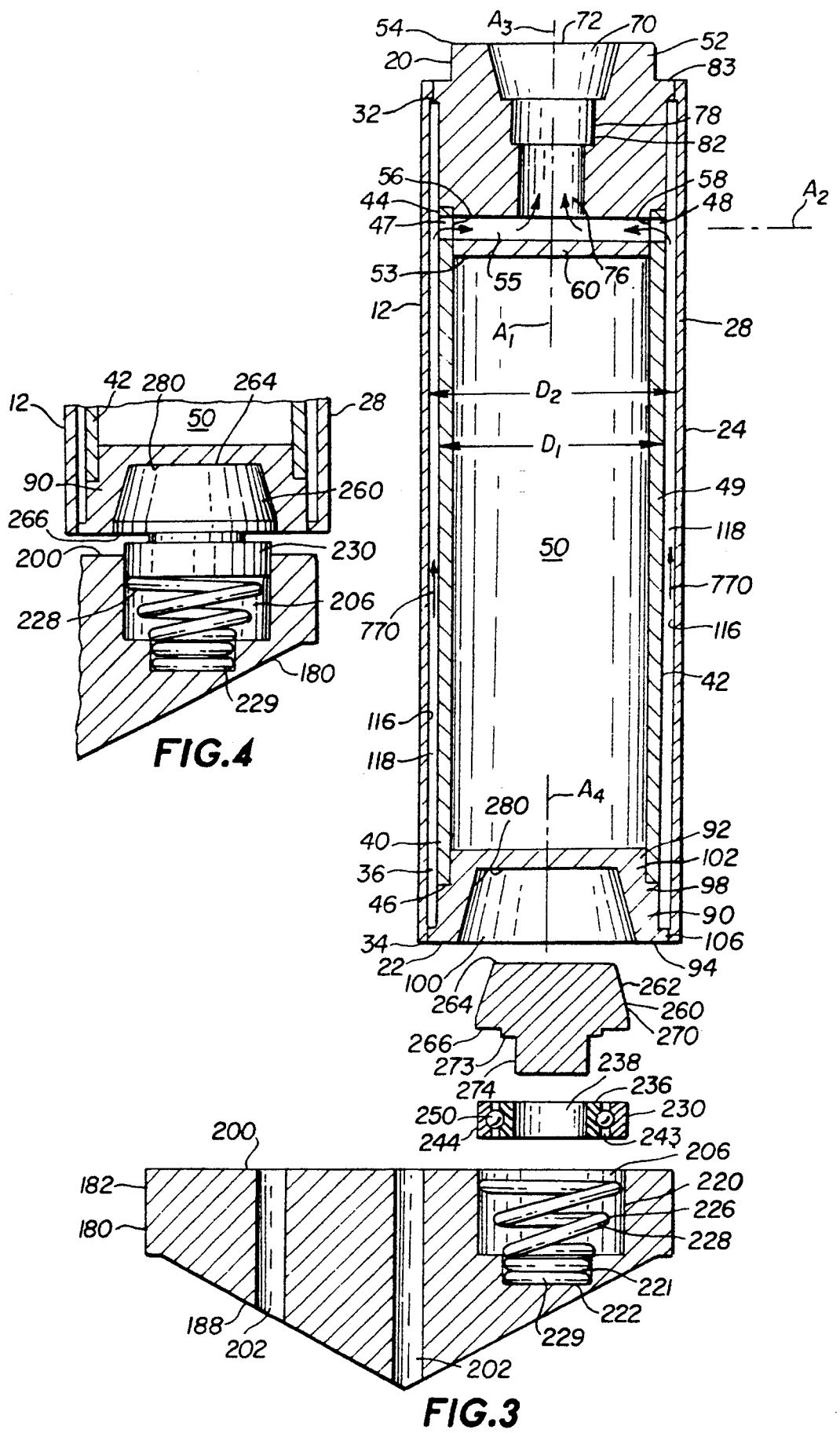

HIGH EFFICIENCY LIQUID FILTRATION SYSTEM AND METHOD FOR USING THE SAME

BACKGROUND OF THE INVENTION

The present invention generally relates to filtration systems for separating solid materials from liquids, and more particularly to a filtration system which incorporates multiple, rotating filter units of cylindrical design in a specialized configuration in order to provide enhanced filtration capacity.

Liquid filtration systems play an important role in a wide variety of industrial and commercial processes. In addition, high efficiency filtration systems are currently being using in numerous medical applications, including but not limited to blood filtration and the separation of microorganisms (e.g. bacteria) from biological or other fluids. In this regard, recent advances in separation technology have created filtration systems which are capable of removing solid materials of a very small size from selected liquids. Many of these systems involve the use of a sophisticated membrane structure associated with a cylindrical cartridge unit. Membrane-type cartridge units are basically described in U.S. Pat. Nos. 4,790,942; 4,867,878; 4,876,013; 4,906,379; 4,911,847; and 5,000,848. All of these references disclose single, membrane-type rotating cartridge units and/or components associated therewith.

Notwithstanding the foregoing filtration units and components, a need exists for a filtration system which is capable of removing substantial quantities of solid materials from liquids or slurries having large amounts of solids therein. Normally, when the filtration of these materials is attempted using conventional filter systems, filtration efficiency decreases substantially for numerous reasons. Primarily, the exposed surfaces of the filtration media become clogged or blocked with solid materials, thereby slowing the separation process and decreasing filter life. This situation also results in decreased filtration capacity due to a continuing need to deactivate and clean the filter system. As a result, the volume of fluid materials to be treated within a given time period is minimized. Problems of this nature typically occur in a wide variety of situations involving many types of liquid or slurry materials including but not limited to yeast slurries and beer test samples in the brewing industry, petroleum products, dairy by-products, medical compositions and the like.

The present invention represents a unique, self-cleaning filtration system which is characterized by a high degree of operating efficiency. The invention specifically involves a specialized filtration apparatus which enables the removal of solid materials from liquids having a high concentration of suspended solids therein. Also, large volumes of liquid materials may be filtered in a minimal amount of time. These goals are accomplished while avoiding the problems listed above. The present invention therefore represents an advance in the art of high efficiency filtration.

SUMMARY OF THE INVENTION

It is an object of the present invention to provide a filtration system of improved efficiency and operating capacity.

It is another object of the invention to provide an improved filtration system which is capable of removing solids from fluid materials having a high suspended solids content.

It is another object of the invention to provide an improved filtration system which incorporates a self-cleaning function, thereby minimizing system down-time.

It is a further object of the invention to provide an improved filtration system which uses a minimal number of operating components.

It is a still further object of the invention to provide an improved filtration system wherein the components thereof are highly durable and characterized by a long life span.

It is an even further object of the invention to provide an improved filtration system wherein multiple cylindrical filter cartridges in close proximity with each other are used in connection with a drive system for simultaneously rotating all of the cartridges, with the simultaneous rotation of such cartridges and the close proximity thereof to each other resulting in an enhanced degree of filtration capacity.

It is an even further object of the invention to provide a highly efficient filtration method which is implemented using the specialized filtration system described herein.

In accordance with the foregoing objects, the present invention involves a unique and efficient system for separating solid materials from liquids and slurries. The invention may be used in connection with a wide variety of materials, and shall not be limited to the filtration of any specific compositions. As discussed in greater detail below, the filtration system described herein is characterized by an improved operating capacity with respect to (1) the separation efficiency of the system, and (2) the amount of fluid materials which may be treated in a given time period. In addition, the system described below has a self-cleaning capability which likewise enhances the operating efficiency of the system while reducing system down-time. These goals are all accomplished using a specialized arrangement of components which are configured in a unique manner.

The high efficiency filtration system of the present invention consists of a primary housing having at least one inlet port therein. Positioned within the primary housing is a plurality of elongate filter cartridge units. The filter cartridge units are positioned directly adjacent each other and oriented vertically within the housing. It is preferred that, within the housing, any one of the filter cartridge units is separated from adjacent cartridge units by a distance not less than about 0.1 inch. This distance is sufficient to create a high degree of fluid turbulence between and around the cartridge units which correspondingly increases filtration capacity and prevents the collection of packed solid materials on the exterior surface of each cartridge unit.

The present invention shall not be limited with respect to the number of filter cartridge units being used. However, in a preferred embodiment, three cartridge units are vertically positioned within the housing in a triangular arrangement wherein each of the cartridge units are spaced equidistantly from each other by a distance not less than about 0.1 inch.

Each cartridge unit includes a longitudinal axis, an upper end, a closed lower end, and a tubular side wall portion. The side wall portion is constructed of a selected filter material. In an optimum and preferred embodiment, the filter material will consist of sintered stainless steel, although other filter materials known in the art and suitable for the purposes set forth herein may likewise be used. Each cartridge unit further includes an interior region therein surrounded entirely by the tubular side wall portion which is adapted to receive fluids which pass through the filter material used to construct the side wall portion. So that collected fluids may ultimately leave the interior region, each cartridge unit further includes an outlet or opening at the upper end thereof.

In a specific and preferred embodiment of the invention, each of the filter cartridge units includes a rigid, durable core member positioned within the interior region thereof. The core member preferably includes a medial section having a first end, a second end, an upper cap member secured to the first end, and a lower cap member secured to the second end. The upper cap member has an elongate opening which passes partially through the upper cap member in a downward direction. The upper cap member further includes a longitudinal bore therethrough which is in fluid communication with the elongate opening in the upper cap member and substantially perpendicular thereto.

The tubular side wall portion of each cartridge unit likewise includes an upper end and a lower end. In a preferred embodiment, the upper cap member described above is fixedly secured to the upper end of the side wall portion. Likewise, the lower cap member is fixedly secured to the lower end of the side wall portion. In this configuration, the medial portion of the core member is positioned entirely within the interior region of the selected cartridge unit. Because the diameter of the medial portion is less than the diameter of the interior region of each cartridge unit, the medial portion is spaced inwardly from the side wall portion to form a fluid flow passageway therebetween. As described in greater detail below, this arrangement of components enables fluids which pass through the side wall portion to travel through the foregoing passageway, pass through the longitudinal bore in the upper cap member of the core member, and out of the core member through the elongate opening in the upper cap member. In this manner, the filtered fluid is able to pass outwardly from each cartridge unit for collection as described below. While this type of cartridge design is preferred with respect to the present invention, other cartridge units of differing design may also be used. Accordingly, the filtration system described herein shall not be limited to any specific type of filter cartridge unit or comparable structure.

In a preferred embodiment of the present invention, the primary housing also includes a cartridge unit support member therein which comprises a planar upper surface having a plurality of openings therein. Each of the openings extends partially through the cartridge unit support member, and further includes a biasing member therein preferably in the form of a spring which is inserted entirely within each opening. Positioned on top of each biasing member is a bearing member with an upper surface and a lower surface. The lower surface of each bearing member rests on the biasing member, while the lower end of one of the cartridge units is positioned on the upper surface of the bearing member. In this configuration, the lower end of each cartridge unit rests on one of the bearing members so that the cartridge unit may rotate relative to the cartridge unit support member. Cartridge rotation in this manner is a key functional attribute of the present invention. It should also be noted that the cartridge unit support member includes multiple drainage bores therein as described below.

Each of the filter cartridge units is operatively connected to drive means which rotates the cartridge units during operation of the filtration system. To connect the cartridge units to the drive means, a tubular shaft member is attached to each cartridge unit. Each shaft member includes an open first end, a closed second end, and a medial portion therebetween. The medial portion includes a tubular outer wall and an internal passageway surrounded by the outer wall. The outer wall further includes at least one port through the medial portion of the shaft member between the first end and the second end which provides access to the internal passageway. The first end of each shaft member is operatively connected to the open upper end of one of the cartridge units. In a preferred embodiment wherein each cartridge unit includes a core member with upper and lower cap members, the first end of each shaft member is operatively connected to the upper cap member and positioned within the elongate opening therein. In this manner, fluid materials leaving each cartridge unit pass into and through the internal passageway of the shaft member associated therewith. The second end of each shaft member is operatively connected to the drive means as described below.

In an optimum and preferred embodiment of the invention, a secondary housing is provided which is attached to and positioned on top of the primary housing. The secondary housing includes a longitudinal axis and a plurality of main bores therethrough, with each main bore being parallel to the longitudinal axis. Each of the main bores is sized to receive the medial portion of one of the shaft members. Specifically, the diameter of each main bore is greater than the diameter of the respective shaft member positioned therein so that the shaft member is freely rotatable within its respective bore. It should also be noted that each of the shaft members is preferably of sufficient length so that the second end thereof extends outwardly from and above the secondary housing, with the first end thereof extending outwardly from and below the secondary housing.

In a preferred embodiment, the secondary housing further includes a plurality of fluid delivery passageways therethrough, with each passageway being perpendicular to the longitudinal axis of the secondary housing and extending radially inward through the secondary housing to the center thereof. Each fluid delivery passageway includes a first end and a second end. The first end of each fluid delivery passageway terminates at the external surface of the secondary housing, and is blocked using a plug member inserted therein. The second end of each fluid delivery passageway extends inwardly and terminates at a position remotely spaced from the main bores. In a preferred embodiment, the second ends of the fluid delivery passageways converge at the center of the secondary housing. At this position, they are placed in fluid communication with a fluid collection bore which extends upwardly within the secondary housing. The fluid collection bore is substantially parallel to the longitudinal axis of the secondary housing, and is remotely spaced from the main bores having the shaft members therein. In addition, the fluid collection bore is ultimately connected to an external fluid collection conduit which leads out of the secondary housing. Using this arrangement of components, fluids passing outwardly from each filter cartridge unit flow through the shaft member associated therewith. The fluids thereafter exit each shaft member through the port in the medial portion thereof, pass into each main bore through the secondary housing, and thereafter pass into the fluid delivery passageways. As a result, fluid materials within the fluid delivery passageways are directed out of the secondary housing though the fluid collection bore and the external fluid collection conduit.

The drive means associated with the filtration system is an integral and important part of the present invention. In a preferred embodiment, the drive means consists of multiple annular pulley members, with each pulley member being connected to the second end of one of the shaft members. Connection in this manner is facilitated since the second end of each shaft member extends above and outwardly from the secondary housing of the filtration system. A continuous belt is operatively connected to and in simultaneous engagement with all of the pulley members, The belt is also operatively connected to a motor unit designed to move the belt and each of the pulley members. In this manner, all of the cartridge units are simultaneously rotated by the drive means at the same speed.

In a preferred embodiment, the belt may be positioned on the pulley members in an orientation which enables all of the pulley members (and cartridge units associated therewith) to rotate in the same direction. Alternatively, the belt may be positioned on the pulley members in a serpentine configuration wherein one portion of the belt is positioned between one or more of the pulley members and the rest of the belt is positioned around the remaining pulley members. This configuration enables one or more of the pulley members to rotate in one direction, with the remaining pulley members rotating in the opposite direction. In certain applications involving the treatment of specific fluids, this alternative configuration will create additional fluid turbulence and enhanced operating capacity as described below.

Operation of the system described herein results in superior filtration efficiency. This is especially true with respect to fluids having a high suspended solids content. In order to use the filtration system of the present invention, a selected liquid having suspended solids therein is routed into the inlet port of the primary housing so that the fluid is placed in physical contact with and between the filter cartridge units in the primary housing. Next, the drive means (e.g. the motor unit) is activated to cause movement of the belt and pulley members connected thereto. Movement of the pulley members causes corresponding movement of the shaft members and the filter cartridge units attached to the shaft members. As a result, the filter cartridge units rapidly spin within the primary housing in a closely adjacent relationship. Depending on the manner in which the belt is positioned on the pulley members, the filter cartridge units will either rotate in the same direction or at least one cartridge unit will rotate in one direction with the remaining cartridge units rotating in an opposite direction. The directional characteristics of the filter cartridge units will vary, based on the specific materials being filtered and the solids content thereof, with the selection of any particular configuration being determined in accordance with preliminary pilot tests on the fluids being treated. Regardless of the directional characteristics of the filter cartridge units, they will all rotate at the same speed (e.g. about 500–4000 rpm [2500 rpm=optimum] in a preferred embodiment).

Rotation of the filter cartridge units in combination with the close proximity of the cartridge units to each other will create a considerable degree of fluid agitation around and between the units. This agitation (which involves the formation of Taylor vortices as well as other unique and uncharacterized phenomena) greatly enhances the filtration capacity of the system compared with systems which involve single cartridge units. Fluid agitation between and around the filter cartridge units creates a "self-cleaning" function wherein solid materials which collect on the exterior surface of each cartridge unit are effectively scrubbed therefrom. As a result, the need to constantly deactivate the system for cleaning is avoided. In addition, the enhanced degree of agitation and rapid fluid motion around and between the filter cartridge units increases fluid pressure levels within the primary housing, thereby accelerating the entry of fluid materials into the cartridge units. As a result, filtration speed is increased which correspondingly increases the amount of fluid materials which may be treated using the system of the present invention. Other benefits achieved in accordance with the invention will be described in greater detail below.

As the fluids come in contact with the side wall portion of each filter cartridge unit (which is comprised of filter materials), they will pass therethrough with any solid materials remaining in the primary housing for subsequent collection or disposal. In accordance with a preferred embodiment of the invention as described above, fluids within the side wall portion of each filter cartridge unit enter the passageway between the side wall portion and the core member, with the fluids thereafter flowing through the longitudinal bore and elongate opening in the upper cap member. Fluid flow in this manner occurs because the longitudinal bore and elongate opening in the upper cap member are in fluid communication with the fluid flow passageway between the side wall portion and the core member as discussed below. The filtered fluids then leave each cartridge unit and flow through the tubular shaft member associated therewith. The fluids thereafter leave each shaft member through the port in the outer wall thereof, pass into the fluid delivery passageways within the secondary housing, and ultimately enter the fluid collection bore as described above. Fluids within the fluid collection bore are thereafter routed through the external fluid collection conduit, and into a suitable storage vessel, container, or the like (depending on whether the collected fluids are to be retained or discarded). It should be noted that the foregoing fluid collection process takes place in a continuous manner while the filtration system is operating (e.g. while the filter cartridge units are rotating within the primary housing). Likewise, the fluid collection process described herein may be varied as necessary in accordance with the specific structural configuration of the cartridge units being used.

The present invention represents an advance in the art of fluid treatment. The filtration system described herein is characterized by an improved filtration capacity with respect to (1) the separation efficiency of the system, and (2) the amount fluid materials which may be treated within a given time period. In addition, the system has a self-cleaning capability which enhances the operating efficiency thereof while reducing system down-time. These and other objects, features, and advantages of the invention will now be described in the following Brief Description of the Drawings and Detailed Description of Preferred Embodiments.

BRIEF DESCRIPTION OF THE DRAWINGS

FIG. 3 is an exploded view (partially in cross-section) of a representative filter cartridge unit, cartridge unit support member, and components associated therewith which are used in the system of FIG. 1.

FIG. 4 is an assembled view (partially in cross-section) of the filter cartridge unit, a portion of the cartridge unit support member, and components associated therewith which are used in the system of FIG. 1.

DETAILED DESCRIPTION OF PREFERRED EMBODIMENTS

As described above, the present invention involves a highly unique and efficient fluid treatment system which is characterized by a plurality of rotating cylindrical filter cartridge units. The use of multiple rotating filter cartridge units in close proximity with each other enhances the filtration capacity of the entire system due to fluid turbulence created between and around the cartridge units as discussed in greater detail below. Furthermore, the system of the present invention is applicable to a wide variety of fluids and slurries having suspended solids therein, and shall not be limited to the treatment of any specific fluid materials for any particular purpose.

Figure 1:
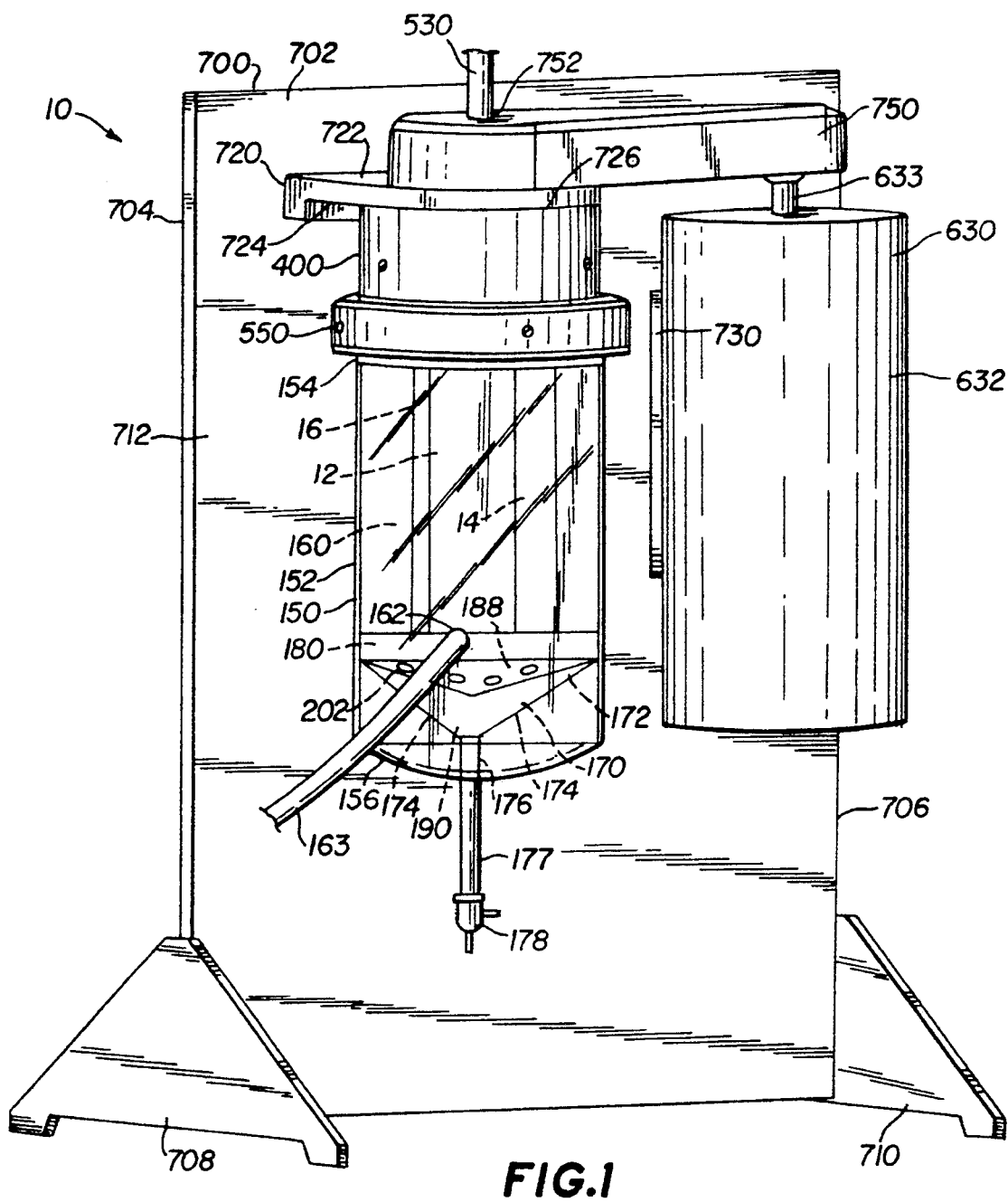
FIG. 1 is a front perspective view of a multi-cartridge filtration system produced in accordance with the present invention in an assembled configuration.
Figure 2:
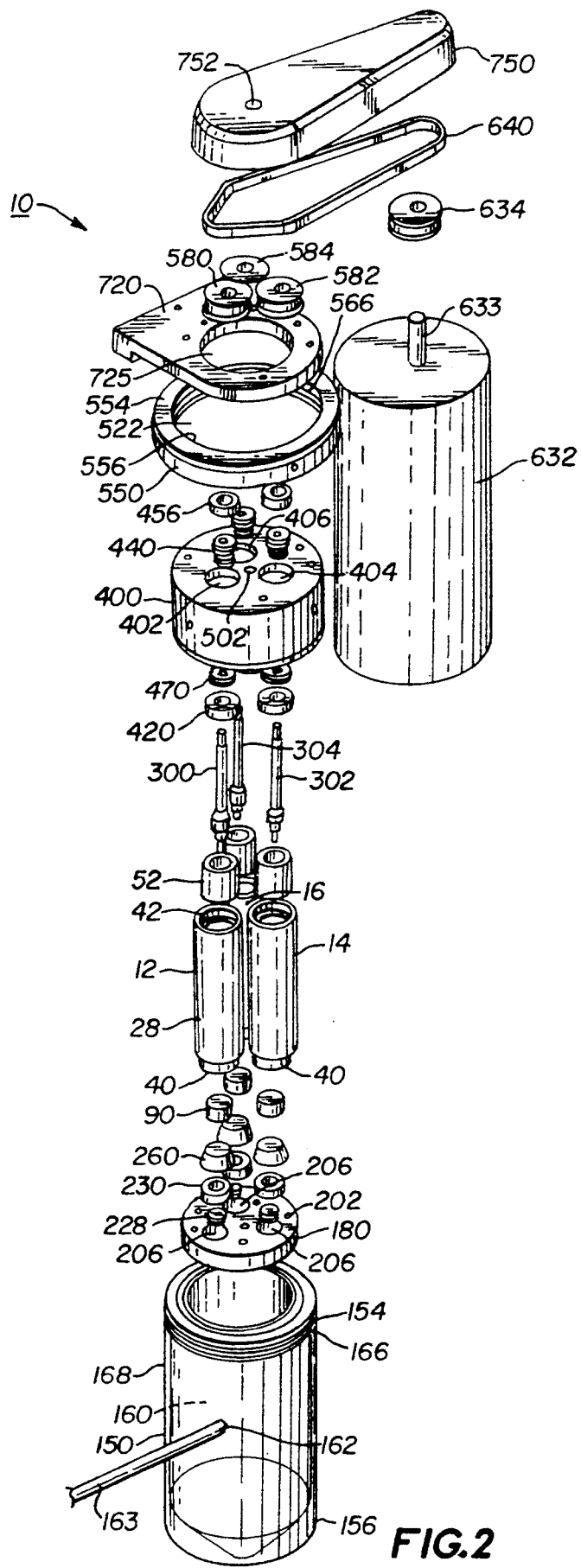
FIG. 2 is an exploded perspective view of the filtration system of FIG. 1 partially illustrating the drive means, primary housing, secondary housing, filter cartridge units, and components associated therewith.

With reference to FIGS. 1–2, the multi-cartridge filtration system of the present invention is generally designated at reference number 10. Each of the various components of the system 10 will be described individually below. First, representative rotatable filter cartridge units 12, 14, 16 which are suitable for use with the filtration system 10 are illustrated in FIG. 2. Each of the filter cartridge units 12, 14, 16 is identical in structure, function, design, and capability. While the filtration system 10 as described herein is illustrated in connection with three separate filter cartridge units 12, 14, 16, the present invention shall not be limited to this specific number of units. In particular, the filtration system 10 may be used in connection with two or more rotatable filter cartridge units, with the ultimate number of cartridge units depending on the size and environment in which the system 10 is to be used.

With reference to FIG. 3, a cross-sectional view of cartridge unit 12 is illustrated. All of the functional and structural characteristics of cartridge unit 12 as described herein are applicable to cartridge units 14, 16 unless otherwise indicated. As illustrated in FIG. 3, the cartridge unit 12 is of substantially cylindrical design, and first includes an open upper end 20, a closed lower end 22, a medial portion 24, and a longitudinal axis "$A_1$". The open character of the upper end 20 and the closed character of the lower end 22 will be described in greater detail below. In a preferred embodiment, the medial portion 24 consists of a tubular side wall portion 28 which is circular in cross-section. The term "tubular" as used herein shall generally signify an elongate structure having a bore or passageway therethrough surrounded by a continuous wall. The side wall portion 28 is manufactured of filter material and is designed to separate suspended solids from fluids or slurries during operation of the filtration system 10. In a preferred and optimum embodiment, the side wall portion 28 is manufactured of sintered metal (e.g. stainless steel, titanium, aluminum, tantalum, and the like). Sintering basically involves the adhesion of metallic particles to each other at temperatures below the melting point of the metals being used. As a result, a durable structure with microscopic pores is formed. A preferred metal used to produce the side wall portion 28 is sintered stainless steel. Such a material normally has a porosity of about 75–85%, with an average pore size ranging from about 3–100 microns depending on the production characteristics selected during the sintering process. The particular filter material to be chosen for a desired application will depend on the size of the suspended solids to be filtered, and the environment in which the filtration system 10 is to be used. Thus, the present invention shall not be limited to any particular pore size in the selected filter material.

As noted above, sintered stainless steel is a preferred material for use in connection with the side wall portion 28 of the filter cartridge unit 12. This material is highly durable and resistant against numerous corrosive compositions (e.g. salt water, phosphoric acid, and organic acids). A tubular side wall portion 28 manufactured from sintered stainless steel is commercially available under the name SIKA-FIL from Newmet Krebsoge, Inc. of Terryville, Conn. (USA).

With continued reference to FIG. 3, the tubular side wall portion 28 further includes an upper end 32, a lower end 34, and an interior region 36 therein. The side wall portion 28 is continuous in configuration and entirely surrounds the interior region 36. In a preferred embodiment, positioned within the interior region 36 is a rigid core member 40. The core member 40 is preferably manufactured from an inert plastic known in the art (e.g. polysulfone). However, the core member 40 may be constructed from a number of different compositions, and shall not be limited to this particular material. The core member 40 includes a medial section 42 having a first end 44 and a second end 46 as illustrated in FIG. 3. The first end 44 includes dual openings 47, 48 therein which are substantially aligned with each other as shown. The medial section 42 further includes a tubular exterior wall 49 which is continuous in design (except with respect to openings 47, 48), and entirely surrounds an internal cavity 50 within the core member 40. As shown in FIG. 3, the diameter "$D_1$" of the medial section 42 of the core member 40 is less than the diameter "$D_2$" of the interior region 36 of tubular side wall portion 28 described above. This configurational relationship and the benefits thereof will be described in greater detail below.

Fixedly secured to the first end 44 of the medial section 42 of core member 40 using a conventional adhesive composition (e.g. a cyanoacrylate or epoxy resin adhesive known in the art) is an upper cap member 52. The upper cap member 52 is preferably made of the same material used to construct the medial section 42, and includes an inner end 53 and an outer end 54. Positioned between the inner end 53 and the outer end 54 at a location adjacent the inner end 53 is a longitudinal bore 55 passing entirely through the upper cap member 52 having a longitudinal axis "$A_2$" which is substantially perpendicular to the longitudinal axis "$A_1$" described above. The longitudinal bore 55 further includes an open first end 56 and open second end 58 as discussed in greater detail below.

The inner end 53 of the upper cap member 52 further includes an inwardly-extending portion 60 of narrowed diameter which includes the bore 55 therethrough (FIG. 3). The inwardly-extending portion 60 is sized to fit within the internal cavity 50 of the medial section 42 of core member 40. To the secure the inwardly extending portion 60 of the upper cap member 52 to and within the first end 44 of the medial section 42 as illustrated, adhesive materials of the type described above may be applied to the first end 44, the inwardly-extending portion 60, or to both of these structures. When the upper cap member 52 is properly attached, the first end 56 of the bore 55 will be aligned with the opening 47 in the first end 44 of the core member 40 (FIG. 3). Likewise, the second end 58 of the bore 55 will be aligned with the opening 48 in the first end 44 of core member 40.

The upper cap member 52 further includes an elongate opening 70 which extends partially through the cap member 52 in a downward direction (FIG. 3). The opening 70 has a longitudinal axis "$A_3$" which is axially aligned with the longitudinal axis "$A_1$" of the filter cartridge unit 12 and perpendicular to the longitudinal axis "$A_2$" of the bore 55. In this configuration, the elongate opening 70 is substantially perpendicular to and in fluid communication with the bore 55 as illustrated. The elongate opening 70 has an upper end 72, a lower end 76, and an intermediate section 78. The lower end 76 terminates at the bore 55 and is in fluid communication therewith. In this configuration, the elongate opening 70 does not pass entirely through the upper cap member 52, and instead terminates at the longitudinal bore 55. Finally, at least a portion 82 of the intermediate section 78 is preferably square in cross-section as described in greater detail below. As discussed below, the opening 70 functions as an outlet in the upper end 20 of the cartridge unit 12.

To secure the upper cap member 52 to the side wall portion 28 of cartridge 12, the upper cap member 52 includes an annular flange 83 designed for attachment to and within the side wall portion 28. A selected adhesive material of the same type described above is applied to the flange 83, the upper end 32 of the side wall portion 28 or to both of these structures. As a result, the upper cap member 52 is effectively secured to the side wall portion 28 of cartridge unit 12.

Fixedly secured to the second end 46 of the medial section 42 of core member 40 using a conventional adhesive composition of the type described above is a lower cap member 90. The lower cap member 90 is preferably made of the same material used to construct the medial section 42 and upper cap member 52, and further includes an inner end 92, an outer end 94, and a medial section 98 therebetween. The outer end 94 includes a substantially frustoconical opening 100 therein which extends into the medial section 98 of the lower cap member 90 but does not pass entirely therethrough. The opening 100 has a longitudinal axis "$A_4$" which is axially aligned with the longitudinal axis "$A_1$" of the cartridge unit 12. The function of opening 100 will be described in greater detail below.

The inner end 92 of the lower cap member 90 further includes an inwardly-extending section 102 of narrowed diameter which is sized to fit within the internal cavity 50 of the medial section 42 of core member 40. To the secure the lower cap member 90 to the second end 46 of the medial section 42 as illustrated, adhesive materials of the type described above may be applied to the second end 46, the inwardly-extending section 102 of the lower cap member 90, or to both of these structures.

To secure the lower cap member 90 to the side wall portion 28 of the cartridge unit 12, the outer end 94 of the cap member includes an annular flange 106 which is designed for attachment to and within the lower end 34 of the side wall portion 28. A selected adhesive composition of the same type described above relative to upper cap member 52 is then applied to the lower end 34 of the side wall portion 28, the annular flange 106, or to both of these structures.

As stated above, FIG. 3 illustrates a cross-sectional view of the cartridge unit 12 having the core member 40 therein. The diameter "$D_1$" of the medial section 42 is less than the diameter "$D_2$" of the interior region 36 of side wall portion 28 as previously noted. In this configuration, the medial section 42 of the core member 40 is spaced inwardly from the side wall portion 28 (e.g., inwardly from the interior surface 116 thereof) to form a fluid flow passageway 118 between the core member 40 and the side wall portion 28. As shown in FIG. 3, the fluid flow passageway 118 extends along the entire length of the medial section 42 of core member 40.

The specific design of filter cartridge unit 12 as described above is preferred for use with the filtration system 10. However, the present invention shall not be limited to the particular design and materials associated with cartridge unit 12. Sintered metal materials other than stainless steel may be used, and the internal configuration of the selected cartridge units may also be varied. In addition, non-metallic cartridge units may be used in the system 10, including but not limited to one or more of the membrane-type structures described above in U.S. Pat. Nos. 4,790,942; 4,867,878; 4,876,013; 4,906,379; 4,911,847; and 5,000,848. However, sintered metal cartridge units are preferred, and provide superior longevity. Cartridge durability in the system 10 is important because of significant fluid turbulence created between the rotating multiple cartridge units 12, 14, 16 described above. Tests conducted using membrane-type cartridge units have demonstrated that membrane disruption and deterioration may occur when high rotational speeds are involved (e.g. speeds above about 2500–3000 rpm). Thus, while membrane-type cartridge units will operate in the system 10 under controlled rotational conditions, cartridge units using sintered metal structures are preferred since they are substantially unaffected by high rotational speeds.

As indicated above, the system 10 may involve two or more filter cartridge units, with the total number of cartridge units depending on the environment in which the system 10 is to be used. However, it is preferred that the system 10 use three filter cartridge units 12, 14, 16 positioned in a triangular arrangement schematically shown in FIG. 7. In the triangular arrangement of FIG. 7, each of the filter cartridge units 12, 14, 16 is positioned at and centered on one of the apices 120, 122, 124 of an equilateral triangle 126. In this configuration, the cartridge units 12, 14, 16 are spaced equidistantly from each other by a distance "$D_3$" which is preferably not less than about 0.1 inch. The distance "$D_3$" may be greater than 0.1 inch as desired and determined by preliminary pilot studies on the fluid being treated. Accordingly, the present invention shall not be limited to the particular design described above which is provided herein as a preferred embodiment. Regardless of the selected design, it is preferred that each cartridge unit be separated from any adjacent cartridge units by the distance "$D_3$" recited above.

All of the cartridge units 12, 14, 16 are positioned within a primary housing 150 which is preferably circular in cross-section and made of transparent plastic (FIGS. 1–2). The primary housing 150 further includes an annular side wall 152, an upper end 154, a lower end 156, and an internal chamber 160 therein which is entirely surrounded by the side wall 152 (FIG. 1). Passing through the side wall 152 is a bore 162 which functions as an inlet port. In a preferred embodiment, the bore 162 will have a flexible conduit 163 (e.g. made of rubber or the like) frictionally or adhesively affixed therein which is used to introduce fluid materials into the primary housing 150. The upper end 154 of the primary housing 150 may also include a threaded region 166 (FIG. 2) in the exterior surface 168 thereof, the function of which will be described below.

With reference to FIG. 1, the bottom portion 170 of the internal chamber 160 includes a conical section 172 with inwardly sloping side walls 174. The side walls 174 lead into a center bore 176 which passes entirely through the lower end 156 of the housing 150. The bore 176 functions as an outlet port as further described below, and preferably includes a flexible drain conduit 177 (e.g. made of rubber or the like) frictionally or adhesively affixed therein. The drain conduit 177 also includes a conventional stopcock assembly 178 attached thereto as discussed below.

Positioned partially with the conical section 172 in the internal chamber 160 (FIG. 1) is a cartridge unit support member 180 shown in enlarged format in FIGS. 3–4. The cartridge unit support member 180 includes an upper portion 182 which is substantially circular in cross-section. The cartridge unit support member 180 further includes a substantially conical lower portion 188 which extends partially into the conical section 172 of the internal chamber 160 (FIG. 1). As a result, an open zone 190 is formed between the conical lower portion 188 and the sloping side walls 174 within the chamber 160 as illustrated in FIG. 1.

With reference to FIGS. 3–4, the upper portion 182 of the cartridge unit support member 180 includes a planar upper surface 200 having multiple drainage bores 202 therein which pass entirely through the support member 180 as illustrated in FIG. 3. The number of drainage bores 202 may be varied, and the present invention shall not be limited to any particular quantity of bores 202. In addition, the cartridge unit support member 180 further includes a plurality of openings 206 therein (FIG. 2), with each opening extending partially through the support member 180. One of the openings 206 is illustrated in FIG. 3. Only one opening 206 is shown in FIG. 3 since the other two openings 206 illustrated in FIG. 2 would not be visible in the cross-sectional view of FIG. 3. As shown in FIG. 3, each opening 206 extends through the upper portion 182 of the support member 180 and terminates above the conical lower portion 188. The precise number of openings 206 in the support member 180 will equal the number of cartridge units to be used in the system 10 (e.g. three in the embodiment described herein).

Each opening 206 (which is preferably circular in cross-section) includes an annular interior side wall 220 and a lower section 221 of narrowed diameter with a substantially planar bottom surface 222. In addition, each opening 206 is designed to receive a biasing member 226 therein as shown in FIGS. 3–4. The biasing member 226 preferably consists of a conical coil spring 228 of standard design which is smaller than that of its respective opening 206 so that the spring 228 may be placed therein as illustrated. Also, the spring 228 preferably has a bottom portion 229 of narrowed diameter which is designed for placement within the lower section 221 of the opening 206. As a result, the bottom portion 229 of the spring 228 will rest on the bottom surface 222 of the opening 206 as illustrated in FIG. 3. Other types of biasing members may be used in connection with the present invention which shall not be limited exclusively to the use of coil springs. For example, conventional miniature leaf-type spring assemblies, resilient rubber or foam pads, and the like (not shown) may also be used.

Positioned on top of the spring 228 within each opening 206 is a bearing member 230. The bearing member 230 is of a type well known in the art which specifically includes an inner annular member 236 having a circular opening 238 therein. The inner annular member 236 is positioned (e.g. nested) within a circular opening 243 in an outer annular member 244, with the opening 243 having a greater diameter than that of the inner annular member 236. However, the diameter of the outer annular member 244 is slightly less than the diameter of its respective opening 206 so that the bearing member 230 may be received therein (FIG. 4). The inner annular member 236 is freely rotatable relative to the outer annular member 244. Rotation in this manner is accomplished through the use of a plurality of spherical steel ball bearing members 250 positioned between the inner and outer annular members 236, 244. This type of bearing member 230 is known in the art and of conventional design. It is commercially available from a variety of sources including but not limited to the Moore Bearing Co. of Golden Conn. (USA)—part no. 6002-SS. In addition, the present invention shall not be limited exclusively to the bearing member 230 described above. Other bearing members of differing structural design may likewise be used with an equal degree of effectiveness, provided that they are capable of placement within the openings 206 in the support member 180.

As illustrated in FIG. 4, the each bearing member 230 is positioned within its respective opening 206 in the support member 180 so that the bearing member 230 rests on top of spring 228. In this configuration, the entire bearing member 230 is axially movable in a free-floating manner on top of its respective spring 228. It should also be noted that each opening 206, spring 228, and bearing member 230 are sized so that each bearing member 230 preferably extends very slightly above the planar upper surface 200 of the cartridge unit support member 180 (FIG. 4).

Positioned on top of each bearing member 230 is a plug-like connecting member 260 having a substantially frustoconical upper portion 262 with a top surface 264, a bottom surface 266, and an angled side wall portion 270. Extending downwardly from the bottom surface 266 and integrally formed therewith is a flange-like portion 273 and a cylindrical section 274 extending outwardly from the flange-like portion 273. The cylindrical portion 274 is preferably circular in cross-section with a diameter which is smaller than the diameter of the circular opening 238 in the inner annular member 236 of each bearing member 230. In accordance with this design, each connecting member 260 is positioned on top of and against one of the bearing members 230 so that the cylindrical section 274 is inserted within the circular opening 238 in the inner annular member 236 of the selected bearing member 230. As a result, each connecting member 260 is freely-rotatable on its respective bearing member 230, with insertion of the cylindrical portion 274 in circular opening 238 maintaining the connecting member 260 in correct position on bearing member 230. Free-rotation of the connecting member 260 on the bearing member 230 is facilitated by the flange-like portion 273 which rests on the inner annular member 236. As result, the bottom surface 266 of the connecting member 260 is elevated (FIG. 4) so that it does not frictionally engage the outer annular member 244 or any other portion of the bearing member 230.

Figure 7:
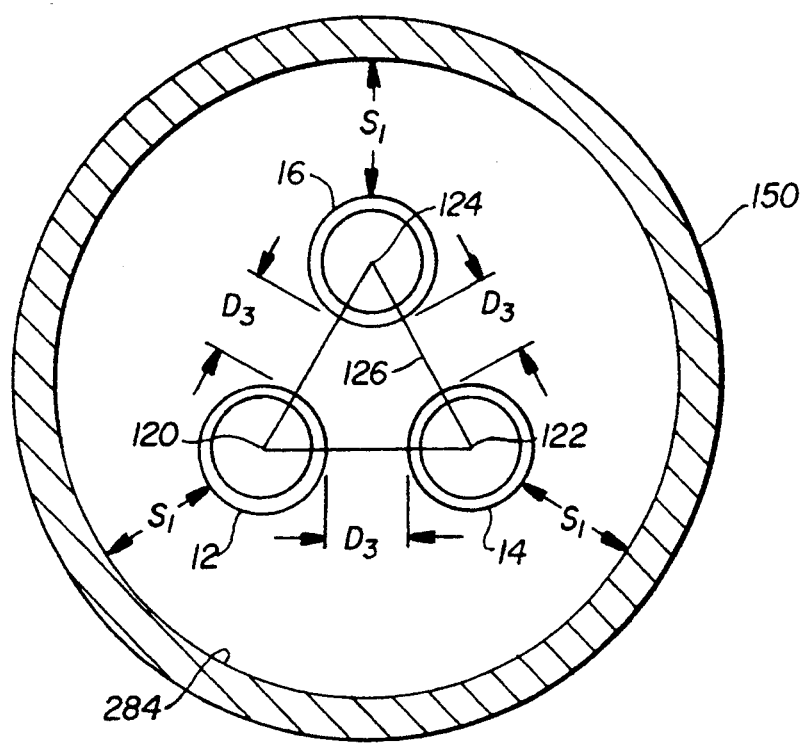
FIG. 7 is cross-sectional view of the primary housing of the system of FIG. 1 illustrating the relative distances between the filter cartridge units, and the distances between the filter cartridge units and the primary housing.

The upper portion 262 of each connecting member 260 is sized for placement within the frustoconical opening 100 in the lower cap member 90 of the cartridge unit 12 as illustrated in FIGS. 3–4. Specifically, the top surface 264 and side wall portion 270 of the connecting member 260 are frictionally engaged with the interior surfaces 280 of the opening 100. As a result, the lower end 22 of the cartridge unit 12 rests on the bearing member 230 so that the cartridge unit 12 may rotate, with the bearing member resting on the spring 228 as illustrated in FIG. 4. The cartridge units 14, 16 are likewise rotatable in the same manner as cartridge unit 12 using the components described above. All of the cartridge units 12, 14, 16, are therefore capable of free-floating, spring-suspended rotation on the cartridge unit support member 180 within the primary housing 150, thereby creating beneficial fluid turbulence within the housing 150 as described below. It should also be noted that, as illustrated in FIG. 7, each of the cartridge units 12, 14, 16 are spaced equidistantly from the interior surface 284 of the housing 150 by a preferred distance "$S_1$" which is not less than about 0.1 inch. The distance "$S_1$" may be greater than 0.1 inch as desired and determined in accordance with preliminary pilot studies on the fluid being treated.

Figure 6:
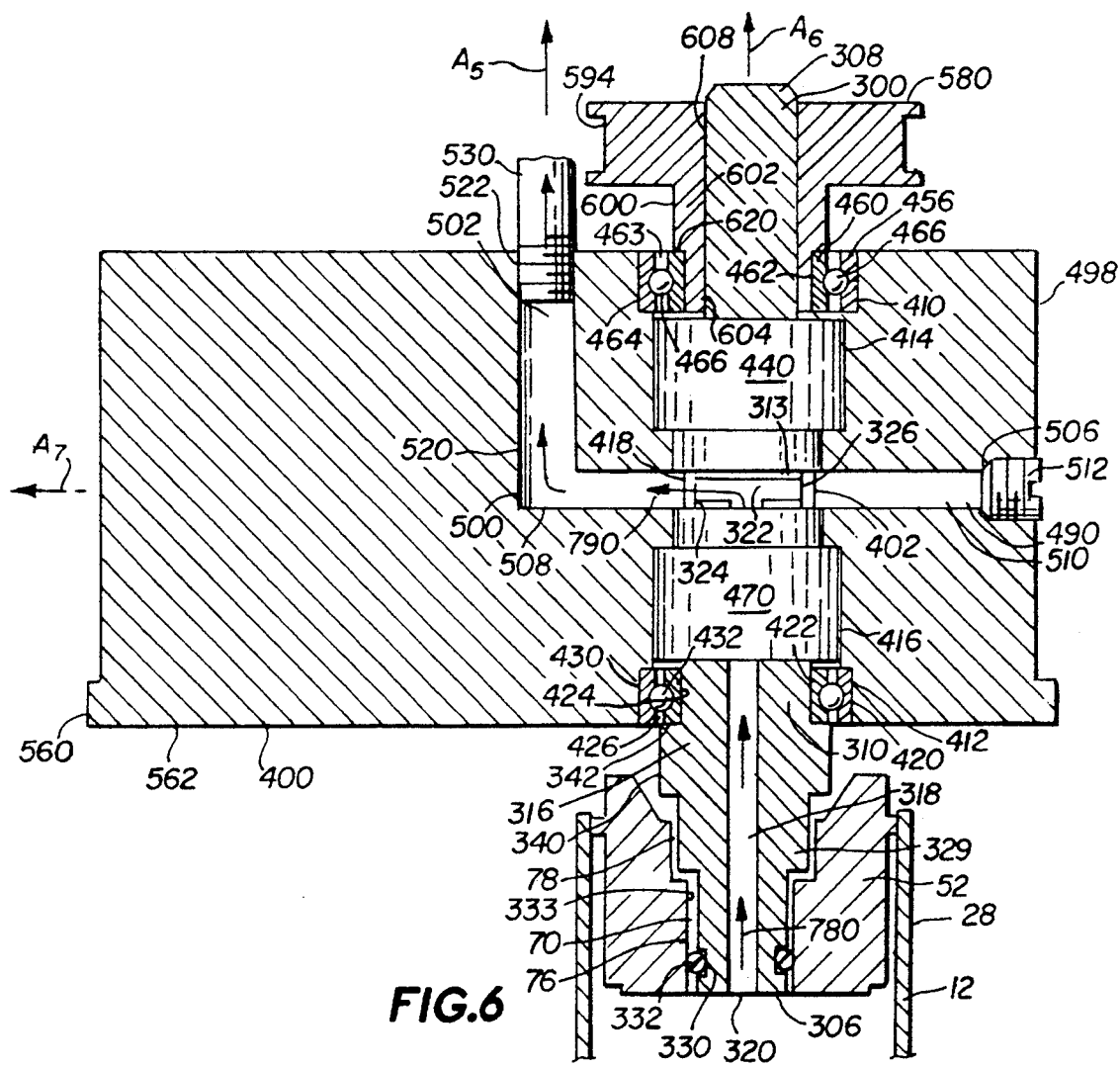
FIG. 6 is a partial cross-sectional view taken along line 6—6 of FIG. 5 which illustrates a representative main bore and fluid delivery passageway within the secondary housing of the system of FIG. 1, as well as a representative shaft member and associated components within the main bore.

With reference to FIG. 2, the filtration system 10 further includes a plurality of tubular shaft members 300, 302, 304 which are designed for connection to the cartridge units 12, 14, 16, respectively. One tubular shaft member is provided for each cartridge unit used in the system 10, regardless of the number of cartridge units involved. For the sake of clarity, only shaft member 300 will be described, with the structural and functional characteristics of shaft member 300 being entirely applicable to shaft members 302, 304 unless otherwise indicated. As illustrated in FIG. 6, shaft member 300 includes an open first end 306, a closed second end 308, and a medial portion 310 between the first end 306 and the second end 308. Between the midpoint 313 of shaft member 300 and the first end 306, the medial portion 310 further includes a tubular outer wall 316 with an internal passageway 318 therein surrounded by the outer wall 316. With continued reference to FIG. 6, the passageway 318 extends continuously from an opening 320 in the first end 306 to the midpoint 313 of the shaft member 300. At this position, a bore 322 is provided which is substantially perpendicular to the passageway 318. The bore 322 passes entirely through the outer wall 316 of the shaft member 300, thereby forming dual ports 324, 326 through the outer wall 316.

The first end 306 of the shaft member 300 is sized for receipt within the lower end 76 of the elongate opening 70 in the upper cap member 52 of cartridge unit 12 as illustrated in FIG. 6. In a preferred embodiment, a portion 329 of the medial section 310 of the shaft member 300 is substantially square in cross-section in order to match the preferred square configuration of portion 82 of intermediate section 78 described above. As a result, the cartridge unit 12 and shaft member 300 can rotate together during operation of the system 10 without any slippage between these components. Furthermore, in a preferred embodiment, the first end 306 of the shaft member 300 is slightly smaller than the lower end 76 of the opening 70 in upper cap member 52 so that the shaft member 300 is easily inserted therein. To ensure a fluid-tight seal between the shaft member 300 and the opening 70, the first end 306 of the shaft member 300 includes an annular recess 330 which further includes a conventional O-ring 332 therein. The O-ring 332 is designed to frictionally engage the interior wall 333 of the opening 70 (e.g. at the lower end 76) to create a fluid-tight seal.

Finally, with continued reference to FIG. 6, the medial portion 310 of the shaft member 300 includes an outwardly-extending annular section 340 having an upper surface 342, the function of which will be described hereinafter. In a preferred embodiment, the annular section 340 is positioned between the first end 306 and the bore 322 as shown in FIG. 6.

With reference to FIGS. 1–2, the filtration system 10 also includes a secondary housing 400 which is adapted to receive all of the shaft members 300, 302, 304 therein. The secondary housing 400 is illustrated cross-sectionally in FIG. 5, and is preferably constructed of steel or other durable material. The secondary housing 400 includes a plurality of main bores 402, 404, 406 which pass entirely therethrough and are substantially parallel to the longitudinal axis "$A_5$" of the housing 400. The bores 402, 404, 406 are sized to receive each of the shaft members 300, 302, 304 therein, respectively. The shaft members 300, 302, 304 have a smaller diameter than that of their respective bores 402, 404, 406 so that free rotation therein is possible. For the sake of clarity, only bore 402 will be described below, with the features of bore 402 being applicable to bores 404, 406 unless otherwise indicated.

In accordance with FIG. 6, bore 402 includes an upper enlarged section 410, a lower enlarged section 412, a first internal section 414, a second internal section 416, and a center region 418. Adhesively or frictionally engaged within the lower enlarged section 412 is a bearing member 420 of the same type as bearing member 230 described above. Specifically, bearing member 420 has an inner annular member 422 with a circular opening 424 therein. The inner annular member 422 is positioned and nested within a circular opening 426 in an outer annular member 430, with the circular opening 426 having a greater diameter than that of the inner annular member 422. The inner annular member 422 is freely rotatable relative to the outer annular member 430 through the use of a plurality of spherical steel ball bearing members 432 rotatably positioned between the inner and outer annular members 422, 430. While this type of bearing member is preferred, the present invention shall not be limited to any particular bearing member as noted above. The circular opening 424 in the inner annular member 422 is sized to receive the medial portion 310 of the shaft member 300 therein so that the medial portion 310 is frictionally engaged within the opening 424. Furthermore, in the configuration shown in FIG. 6, the upper surface 342 of the annular section 340 of shaft member 300 rests on the inner annular member 422. It should be noted than the relative diameters of the annular section 340 and the inner annular member 422 are substantially equal. Accordingly, the shaft member 300 and inner annular member 422 are able to rotate together without frictionally engaging the outer annular member 430 of bearing member 420.

Positioned within the first internal section 414 of the bore 402 is a mechanical, commercially available rotating fluid seal member 440 of conventional design (schematically illustrated in non cross-sectional form in FIG. 6). The medial portion 310 of the shaft member 300 is fixedly positioned (by frictional engagement or the like) within the seal member 440. The seal member 440 is used so that fluid materials which ultimately leave the shaft member 300 through ports 324, 326 will not leak upwardly into the main bore 402 as described in greater detail below. In addition, the seal member 440 enables rotation of the shaft member 300 within the bore 402 in a fluid-tight manner. Seal member 440 is of standard design with its operating characteristics being well-known in the art. An exemplary seal member 440 suitable for use herein is commercially available from the John Crane Seal Co. of Morton Grove, Ill. (USA) under the designation "Type 6". However, it should be noted that other commercially available seal members may be used in accordance with the present invention which shall not be limited to the use of any particular fluid seal systems.

Adhesively or frictionally engaged within the upper enlarged section 410 above and spaced outwardly from the seal member 440 is a bearing member 456 of the same type as bearing member 230. Bearing member 456 has an inner annular member 460 with a circular opening 462 therein. The inner annular member 460 is positioned and nested within a circular opening 463 in an outer annular member 464, with the circular opening 463 having a greater diameter than that of the inner annular member 460. The inner annular member 460 is freely rotatable relative to the outer annular member 464 through the use of a plurality of spherical steel ball bearing members 466 which are rotatably positioned between the inner and outer annular members 460, 464. Again, while this type of bearing member is preferred, the present invention shall not be limited to any particular bearing design. The circular opening 462 in the inner annular member 460 is sized to receive the medial portion 310 of the shaft member 300 and additional components of the system 10 as discussed in greater detail below.

Positioned within the second internal section 416 of the bore 402 above and spaced inwardly from the bearing member 420 is a mechanical, commercially-available rotating seal member 470 of the same conventional design as seal member 440 (schematically illustrated in non cross-sectional form in FIG. 6). The medial portion 310 of the shaft member 300 is fixedly positioned (by frictional engagement or the like) within the seal member 470. The seal member 470 is used so that fluid materials which ultimately leave the shaft member 300 through ports 324, 326 will not leak downwardly into the main bore 402. In addition, the seal member 470 enables rotation of the shaft member 300 within the bore 402 in a fluid-tight manner. Seal member 470 is of standard design with its operating characteristics being well-known in the art. An exemplary seal member 470 suitable for use in the system 10 is commercially available from the source listed above with respect to seal member 440.

Figure 5:
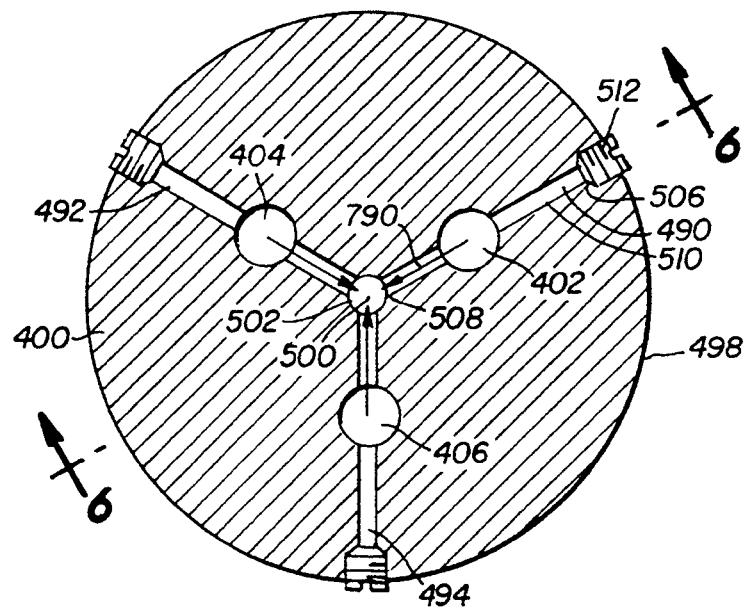
FIG. 5 is a cross-sectional view of the secondary housing of the system of FIG. 1 illustrating the main bores and fluid delivery passageways within the secondary housing, wherein the shaft members and associated components have been removed.

With reference to FIG. 5, secondary housing 400 further includes a plurality of fluid delivery passageways 490, 492, 494 in fluid communication with the main bores 402, 404, 406, respectively. In a preferred embodiment, one fluid delivery passageway will be provided for each main bore and cartridge unit associated therewith. Furthermore, each fluid delivery passageway 490, 492, 494 begins at the outer surface 498 of the secondary housing 400 and terminates at the center 500 of the housing 400 (FIG. 5). Positioned at the center 500 of the housing 400 and remotely spaced from the main bores 402, 404, 406 is a fluid collection bore 502 (FIGS. 5-6). The fluid collection bore 502 is designed to receive fluid materials from each of the fluid delivery passageways 490, 492, 494. As illustrated, all of the fluid delivery passageways 490, 492, 494 converge at the fluid collection bore 502 in the center 500 of the secondary housing 400.

To clearly illustrate the functional and structural characteristics of the fluid delivery passageways 490, 492, 494, passageway 490 will be described in detail. The specific features of fluid delivery passageway 490 are applicable to passageways 492, 494 unless otherwise indicated below. As shown in FIGS. 5-6, the passageway 490 includes a first end 506, a second end 508, and a medial section 510 between the first and second ends 506, 508. The first end 506 terminates at the outer surface 498 of the secondary housing 400, and preferably includes a fluid-tight threaded plug member 512 secured therein (shown non cross-sectionally in FIG. 6) to prevent the leakage of fluid materials outwardly from the secondary housing 400. Passing through the medial section 510 of the passageway 490 is the main bore 402 as illustrated. In accordance with this structural relationship, the passageway 490 is in fluid communication with the bore 402. Furthermore, in a preferred embodiment, the longitudinal axis "$A_6$" of the main bore 402 is substantially perpendicular to the longitudinal axis "$A_7$" of the passageway 490 (FIG. 6).

With continued reference to FIG. 6, the bore 322 in the shaft member 300 (as well as the ports 324, 326) are precisely positioned within the center region 418 of the main bore 402 and in axial alignment with the fluid delivery passageway 490. As a result, fluid materials leaving the rotating shaft member 300 via the bore 322 and ports 324, 326 will flow into the fluid delivery passageway 490. Again, fluid leakage into other portions of the secondary housing 400 during this process is prevented through the use of seal members 440, 470.

The second end 508 of the fluid delivery passageway 490 is remotely spaced from the main bore 402 and positioned substantially at the center 500 of the secondary housing 400. At this position, the passageway 490 (and the other fluid delivery passageways 492, 494) are in fluid communication with fluid collection bore 502. The fluid collection bore 502 has the same longitudinal axis as the axis "$A_5$" of the secondary housing 400 which is perpendicular to the longitudinal axis "$A_7$" of the passageway 490 and parallel with the longitudinal axis "$A_6$" of main bore 402. As shown in FIG. 6, the fluid collection bore 502 has a first end 520 which is positioned at the center 500 of the secondary housing 400 and a second end 522 having an external fluid collection conduit 530 (shown in non cross-sectional form in FIG. 6) which is partially engaged therein in a conventional manner.

It should also be noted that the secondary housing 400 may have additional tunnels or passageways therein (not shown) which extend inwardly from the outer surface 498 thereof to one or more of the main bores 402, 404, 406 so that they may be flushed and cleaned as desired. In addition, there are a number of ways in which the primary housing 150 may be secured to the secondary housing 400, and present invention shall not be limited to any particular attachment method. For example, in one embodiment illustrated in FIG. 2, an annular retaining ring 550 is provided which has a central opening 552 therein. The diameter of the opening 552 is greater than the diameter of the secondary housing 400, thereby allowing passage of the housing 400 through the opening 552 so that the ring 550 may be positioned on the housing 400 as illustrated in FIG. 1. However, the top portion 554 of the ring 550 is manufactured so that it includes an annular, outwardly extending portion 556 which is sized to abuttingly engage an annular flange 560 extending outwardly from the bottom surface 562 of the secondary housing 400 (FIG. 6). Using these components, the retaining ring 550 may be placed on the secondary housing 400, with accidental removal of the ring 550 being prevented by cooperative action of the outwardly extending portion 556 of the ring 550 and the annular flange 560 on the secondary housing 400. Furthermore, as illustrated in FIG. 2, the ring 550 includes an internal threaded region 566. To secure the primary housing 150 and secondary housing 400 together, these components are first axially aligned and placed together so that the bottom surface 562 of the secondary housing 400 is positioned against the upper end 154 of the primary housing 150. As noted above, the upper end 154 of the primary housing 150 includes threaded region 166 in the exterior surface 168 thereof. The retaining ring 550 is then urged downwardly and rotated so that the threaded region 566 of the ring 550 engages the threaded region 166 of the primary housing 150. The ring 550 is then tightened as desired. Other exemplary attachment systems for the primary and secondary housings 150, 400 include the use of external clamping mechanisms known in the art and conventional screw type connecting systems (not shown), with the present invention not being limited to Any particular attachment assembly.

To effectively rotate all of the cartridge units 12, 14, 16 simultaneously during operation of the system 10, a specialized motor drive system is provided. With reference to FIG. 2, each of the shaft members 300, 302, 304 associated with cartridge units 12, 14, 16 includes an annular pulley member 580, 582, 584 thereon, respectively. Regarding the structural configuration of the pulley members 580, 582, 584, pulley member 580 (and shaft member 300 secured thereto) will be described. Unless otherwise indicated, the following information regarding shaft member 300 and pulley member 580 is equally applicable to pulley members 582, 584 and shaft members 302, 304. As shown in FIG. 6, annular pulley member 580 includes a recessed region 594 which is sized to receive a continuous belt as discussed below. Formed as an integral part of the pulley member 580 and extending downwardly therefrom is a shaft portion 600 which includes a first section 602 and a second section 604. The second section 604 has a smaller diameter than the first section 602 (FIG. 6). The pulley member 580 also has an opening 608 which passes entirely therethrough. The opening 608 is designed to receive part of the closed second end 308 and medial portion 310 of the shaft member 300 therein. The pulley member 580 is fixedly secured in position on the shaft member 300 by frictional engagement between these components or through the use of adhesives, set screws within the pulley member 580 (not shown) or other conventional fastening systems.

As shown in FIG. 6, the second section 604 of the shaft portion 600 of pulley member 580 is positioned (e.g. frictionally engaged) within the circular opening 462 in the inner annular member 460 of bearing member 456. In addition, the first section 602 of the shaft portion 600 further includes a lower annular face 620 which rests on the inner annular member 460 of bearing member 456 so that the entire shaft assembly (e.g. the shaft member 300 and pulley member 580 secured thereto) may freely rotate on the bearing member 456. It should be noted that the diameter of the first section 602 of pulley member 580 is substantially equal to the diameter of the inner annular member 460 of bearing member 456 so that the first section 602 does not frictionally engage the outer annular member 464 of bearing member 456.

To rotate all of the pulley members 580, 582, 584 and cartridge units 12, 14, 16 in a simultaneous manner, motor drive means 630 is provided as illustrated in FIGS. 1, 2, 8, and 9. In a preferred embodiment, the motor drive means 630 consists of a conventional electric motor 632 which is well known in the art. The motor 632 includes a center drive shaft 633 (FIGS. 8–9) having a drive pulley member 634 secured thereto. In a preferred embodiment, the drive pulley member 634 has a structural configuration substantially identical with that of the annular pulley member 580. Attachment of the drive pulley member 634 to the drive shaft 633 may be undertaken by welding, adhesive affixation, set screws within the drive pulley member 634 (not shown) which may be tightened against the drive shaft 633, or other conventional attachment methods.

Figure 8:
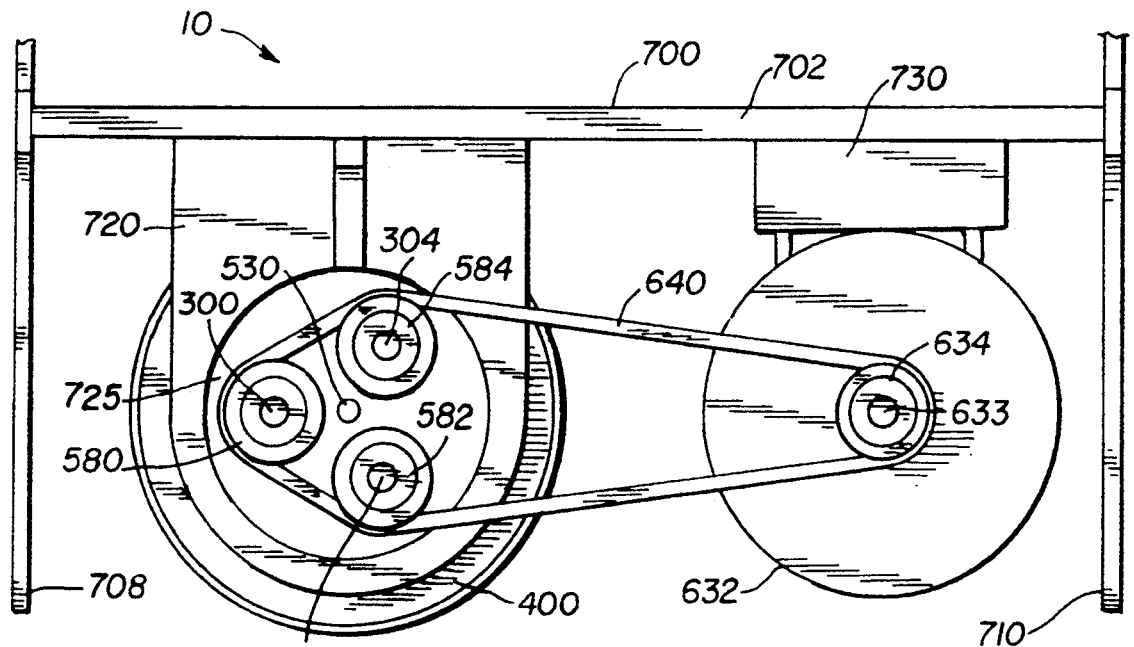
FIG. 8 is a top plan view of a first embodiment of the system of FIG. 1 wherein the belt guard has been removed to illustrate the orientation of the drive belt around the pulley members associated with the filter cartridge units.
Figure 9:
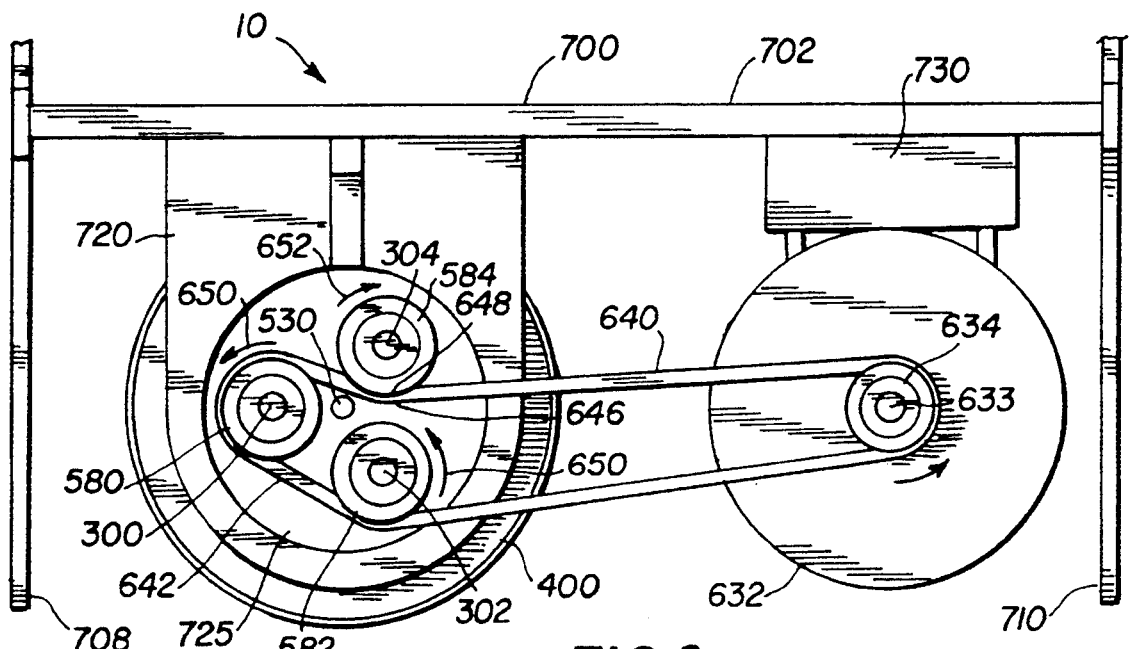
FIG. 9 is a top plan view of a second embodiment of the system of FIG. 1 wherein the belt guard has been removed to illustrate an alternative orientation of the drive belt relative to the pulley members associated with the filter cartridge units.

So that the motor 632 may simultaneously rotate the cartridge units 12, 14, 16, a continuous belt 640 is provided which is made of rubber or the like. In a first embodiment, the belt 640 is positioned on the drive pulley member 634 and the pulley members 580, 582, 584 in the configuration shown in FIG. 8. In this configuration, the belt 640 is positioned around the pulley members 580, 582, 584, and 634 so that they all rotate in the same direction (either clockwise or counterclockwise). In an alternative embodiment, the belt 640 may be positioned on the pulley members 580, 582, 584 in a serpentine configuration as shown in FIG. 9. Specifically, portion 642 of the belt 640 is positioned around the pulley members 580, 582 as in the first embodiment of FIG. 8, while portion 646 of the belt 640 is positioned between pulley members 582, 584. As a result, the portion 646 contacts the pulley member 584 at an inside position 648 thereon. Using this configuration, the pulley members 580, 582 will rotate in one direction (e.g. in a first direction as indicated by arrows 650) while the pulley member 584 will rotate in a second direction opposite the first direction (see arrow 652). In certain applications involving the treatment of specific fluids, this alternative configuration will create additional fluid turbulence and enhanced operating capacity as described below. The selection of a particular belt arrangement will normally involve preliminary pilot studies on the fluid materials being treated so that the best method may be chosen. Furthermore, the embodiment of FIG. 9 shall not be limited to a situation wherein pulley member 584 is rotating in an opposite direction with respect to pulley members 580, 582. Instead, the belt 640 may be oriented so that, for example, the pulley members 580, 584 are rotating in a first direction with the pulley member 582 rotating in a second opposite direction.

Finally, with reference to FIG. 1, the entire system 10 preferably includes a support stand 700 which is designed to suspend the primary housing 150, secondary housing 400 and motor 632 in an upright, vertical position. To accomplish this, a panel member 702 is provided which includes side edges 704, 706 to which triangular support legs 708, 710 are respectively secured. The support legs 708, 710 are secured to the side edges 704, 706 by welding or the use of conventional screws (not shown). The panel member 702 further includes an outer face 712 having a mounting plate 720 secured thereto by welding or conventional mechanical fasteners (e.g. screws). The mounting plate 720 has an upper surface 722, a lower surface 724, and a circular opening 725 therein (FIG. 2) which is sized to allow the pulley members 580, 582, 584 to pass therethrough. As illustrated in FIG. 1, the top surface 726 of the secondary housing 400 is secured by welding, mechanical fasteners (e.g. screws), or the like to the lower surface 724 of the mounting plate 720 in order to suspend the primary and secondary housings 150, 400 in position. Likewise, the motor 632 is fixedly secured to a plate member 730 or other comparable structure by welding or mechanical fasteners (e.g. screws), with the plate member 730 and attached motor 632 being secured to outer face 712 of the panel member 702 in the same manner. However, it shall be understood that the mounting system for the foregoing components (e.g. the primary housing 150, secondary housing 400, and the motor 632) may be varied, and shall not be exclusively limited to the support stand 700 described above.

Finally, to ensure safe operation of the system 10, an optional belt guard 750 illustrated in FIGS. 1-2 may be positioned over the belt 640 and pulley members 580, 582, 584, 634. The belt guard 750 is preferably secured to the upper surface 722 of the mounting plate 720 using screws or other conventional mechanical fasteners. Also, it is preferred that the belt guard 750 have an opening 752 therein. The opening 752 is sized and positioned to enable passage therethrough of the external fluid collection conduit 530 (FIGS. 1 and 6) which leads into the secondary housing 400 as previously described.

Having herein described the structural components associated with a preferred embodiment of the filtration system 10, a brief description of its operational characteristics will now be presented.

Operation

As described above, the system 10 enables the high-efficiency separation of solids from a wide variety of different liquids. For example, materials ranging from beer to medicines and biological compositions may be filtered, depending on the characteristics of the selected filter materials used in connection with the filter cartridge units 12, 14, 16. The present invention shall therefore not be limited to the filtration of any particular materials.

To filter solid materials from a selected liquid, the desired liquid is first introduced into the primary housing 150 through the conduit 163 which is secured within bore 162 in the side wall 152. As the liquid enters the housing 150, it flows between and around the filter cartridge units 12, 14, 16. When the housing 150 becomes substantially filled with liquid, the motor 632 is activated which causes movement of the belt 640 and pulley members 580, 582, 584, 634 attached thereto. As a result, cartridge units 12, 14, 16 rotate simultaneously and at the same speed. In a preferred embodiment, the motor 632 is adjusted so that it rotates the cartridge units 12, 14, 16 at a uniform speed of about 500-4000 rpm (2500 rpm=optimum), with the actual selected speed being determined by preliminary pilot studies and the like. In the embodiment of FIG. 8, all of the cartridge units 12, 14, 16, will rotate in the same direction and at the same speed. As a result, a high degree of fluid turbulence is created around and between the rotating cartridge units 12, 14, 16. This fluid turbulence basically involves the formation of Taylor vortices and other uncharacterized phenomena which create rotating fluid currents and increased fluid pressures around the cartridge units 12, 14, 16. These fluid currents and pressures not only enhance fluid flow through the cartridge units 12, 14, 16, but also continuously scrub the exterior surfaces of the units 12, 14, 16 so that the blockage thereof is minimized or prevented. As a result, system down-time normally required for cleaning is substantially minimized which greatly increases filtration efficiency compared with single cartridge systems as described in the "Example" section below.

In addition, when the embodiment of FIG. 9 is involved wherein one of the cartridge units 12, 14, 16 is rotating in an opposite direction from the other units, an additional degree of fluid turbulence is created adjacent the interior surface 284 of the primary housing 150 which may further enhance filtration efficiency, depending on the type of fluid being filtered and other parameters determined by preliminary pilot studies. This additional phenomenon (which is the subject of ongoing research) may cause enhanced scrubbing of the exterior surfaces of one or more cartridge units 12, 14, 16.

As the cartridge units 12, 14, 16 are rotating within the primary housing 150, filtration of the selected liquid materials takes place. To illustrate and describe this process, filtration will be discussed with respect to cartridge unit 12. However, information provided regarding cartridge unit 12 is equally applicable to the other cartridge units 14, 16 in the system 10.

During operation of the filtration system 10, the cartridge unit 12 will rotate around its longitudinal axis "$A_1$" (FIG. 3). As cartridge unit 12 rotates, fluid materials pass through the side wall portion 28, with suspended solids being prevented from passing therethrough. Fluid materials which pass through the side wall portion 28 enter the fluid flow passageway 118 and travel upwardly in the direction of arrows 770 (FIG. 3). Because the lower cap member 90 does not have any openings therein, and because it is attached to the side wall portion 28 in a fluid-tight configuration, the lower end 22 of the cartridge unit 12 is effectively closed as noted above. Accordingly, any fluid materials which pass downwardly toward the lower cap member 90 do so on a temporary basis and are thereafter directed upwardly due to the closed nature of the lower end 22 of the cartridge unit 12. The filtered fluid materials within the fluid flow passageway 118 are then collected in accordance with the steps described below.

The filtered fluid materials thereafter pass through the openings 47, 48 in the first end 44 of the medial section 42, and into the longitudinal bore 55 (FIG. 3) in the upper cap member 52. Once again, fluid materials will not leak outwardly from the fluid flow passageway 118 within the cartridge unit 12 due to the fluid-tight adhesive seal between the upper cap member 52 and the side wall portion 28. The fluid materials within the bore 55 converge at the center thereof and pass upwardly into the elongate opening 70. Because the opening 70 terminates at the upper end 20 of the cartridge unit 12, the upper end 20 is effectively open to the outside, thereby permitting the filtered fluid materials to exit the cartridge unit 12.

The filtered fluid materials then pass into the shaft member 300 associated with the cartridge unit 12 and travel upwardly through the passageway 318 in the direction of arrows 780 due to a high degree of internal fluid pressure within the system 10 caused by the continuous influx of additional fluids. The fluid materials thereafter enter the bore 322 in shaft 300 and exit through the ports 324, 326. As the shaft member 300 continues to spin within the main bore 402 of the secondary housing 400, the fluid materials enter the fluid delivery passageway 490. Fluid leakage upwardly or downwardly into the bore 402 within the secondary housing is prevented by the seal members 440, 470. Next, the fluid materials pass through the fluid delivery passageway 490 and travel toward the second end 508 of passageway 490 (in the direction of arrows 790 shown in FIGS. 5–6). Only a minimal amount of fluid materials will enter the portion of the fluid delivery passageway 490 between the main bore 402 and the first end 506 of passageway 490 since the first end 506 is sealed at the outer surface 498 of the secondary housing 400 using the plug member 512. Once this portion of the fluid delivery passageway 490 becomes filled with fluid materials, additional fluids will not enter, thereby enabling most of the fluid materials to flow toward the second end 508 of the fluid delivery passageway 490.

As noted above, all of the fluid delivery passageways 490, 492, 494 converge at the center 500 of the secondary housing 400. Because incoming fluids enter the fluid delivery passageways 490, 492, 494 under a considerable degree of pressure, such fluids converge at the center 500 and are forced upwardly into and through the fluid collection bore 502. Fluid materials passing into the fluid collection bore 502 thereafter pass into the collection conduit 530 and are stored or discarded as desired. The collected fluid materials are highly purified due to the multiple rotating filter cartridge units 12, 14, 16 as well as the other functional characteristics of the system 10 described above.

Collected solid materials and residual liquids within the primary housing 150 are then drained from the system 10. This is accomplished by opening the stopcock assembly 178 in the drain conduit 177 extending outwardly from the housing 150. As a result, collected solid materials and residual liquids pass downwardly through the drainage bores 202 in the cartridge unit support member 180, into the open zone 190 in the bottom portion 170 of the chamber 160 within housing 150, and outwardly through the conduit 177 and stopcock assembly 178. The fluids and solids may thereafter be collected or discarded as desired.

As previously stated, the use of multiple rotating filter cartridge units within a closed housing provides numerous and substantial benefits. Specifically, one of the primary benefits associated with the system of the present invention involves the self-cleaning capabilities thereof. Such capabilities result from the use of multiple cartridge units which not only generate conventional Taylor vortices within the system housing, but also generate other, uncharacterized forces which effectively prevent the accumulation of solid materials on the exterior surfaces of the cartridge units. As a result, filtration efficiency is substantially improved due to (1) a greater flow rate through the cartridge units which do not experience the rapid accumulation of solids thereon as in single cartridge systems; and (2) a reduction in the amount of system down-time which is needed for removing accumulated solids (which is significant in single cartridge systems compared with the present invention).

As noted above, fluid turbulence generated in the multi-cartridge system of the invention effectively prevents the rapid accumulation of solids on the cartridge units, thereby reducing or eliminating the need to continuously deactivate the system for cleaning. In accordance with the invention, these benefits are achieved in multi-cartridge systems which use the cartridge units described above (e.g., see FIG. 3) and other cartridge units of different design. To demonstrate the benefits which may be achieved through the use of a rotating, multi-cartridge system produced in connection with the invention, the following Example is provided:

EXAMPLE

In this Example, the liquid being filtered involved a brewery product known as "aging drop beer" which includes a variety of solid components therein (e.g. yeast cell debris and other residual solids). The initial turbidity of this material in the present Example was 650 ppm of the solid components listed above. Two experimental tests were run using aging drop beer.

Test One

In test number 1, a system was employed which used a single, rotating cartridge unit positioned within a containment vessel. The cartridge unit consisted of a membrane-type 0.45 micron cylindrical filter cartridge produced by Membrex, Inc. of Garfield, N.J. (USA).

Test Two

Test number 2 involved three rotating filter cartridge units of exactly the same type used in test number 1. These units were used and arranged in a system comparable to system 10 described above. In both tests, the cartridge units were rotated in the same direction and at the same speed (e.g. 1500 rpm). Also, the starting flow rate of aging drop beer into the systems in both tests was 200 ml/min.

TABLE I

|  | Results: | |
| --- | --- | --- |
|  | Test #1 | Test #2 |
| Total run time: | 1.0 hr[1] | 3.0 hr[2] |
| Initial turbidity: | 650 ppm | 650 ppm |
| Effluent (output) turbidity: | 4.0 ppm | 2.0 ppm |
| Ending flow rate: | 16 ml/min.[3] | 25 ml/min. |
| Total flow: | 1.85 L | 10.45 L[4] |
| Average flow rate: | 36.7 ml/min. | 68.2 ml/min. |

[1] single cartridge system in test number 1 was stopped after 1.0 hr. since the cartridge unit became clogged at the surface thereof, with cloggage being defined as a fluid flow rate through the cartridge unit of less than about 15-16 ml/min.
[2] multiple cartridge system in test number 2 never reached a point in which it became clogged (e.g. characterized by a fluid flow rate through the cartridge units of less than about 15-16 ml/min.), and could have run even longer than three hours.
[3] at this flow rate (16 ml/min.) the system in test number 1 was technically clogged as noted above.
[4] this value does not represent a maximum value since the multiple cartridge system of test number 2 never became clogged during the test in accordance with the definition provided above.

The foregoing Example clearly demonstrates the superior results achieved in a multi-cartridge system compared with single cartridge systems. Specifically, the single cartridge system of test number 1 become clogged after only one hour as characterized by a flow rate of about 16 ml/min. However, in the system of test number 2, cartridge clogging (as characterized by a flow rate of less than about 15–16 ml/min.) did not occur even after three hours of continuous use. In fact, the flow rate in the system of test number 2 at the end of three hours was 25 ml/min. which is significantly greater than the flow rate of 16 ml/min. in the system of test number 1 after one hour.

In the multi-cartridge system of test number 2, a flow rate of 16 ml/min. at or before expiration of the three hour period would have been expected since the system of test number 2 had been running three times as long as the system of test number 1. More specifically, the one cartridge system became clogged after one hour which would have created an expectation that the three cartridge system would become clogged after three hours. However, this situation did not occur, with the system of test number 2 having a flow rate substantially above the 16 ml/min. level, even after three hours. The multi-cartridge system was able to filter 10.45 L of fluid without becoming clogged, while the single cartridge system filtered only 1.85 L of fluid before clogging occurred. Accordingly, while the single cartridge system processed only 1.85 L of fluid before it became clogged, the multi-cartridge system processed about 3.5 L of fluid per cartridge (e.g. 10.45 L divided by 3) because the cartridge units did not become clogged and could run longer. Clog prevention in this manner is due to both Taylor vortices and unknown physical phenomena within the system as previously described. Increased fluid turbulence creates a scrubbing effect which prevents the rapid accumulation of solids on the cartridge units.

Having herein described preferred embodiments of the invention, it is anticipated that suitable modifications may be made thereto by individuals skilled in the relevant art which nonetheless remain within the scope of the invention. For example, the construction materials, component size (e.g. length and width of the filter cartridge units), the number of cartridge units, the arrangements of conduits, ports, bores, openings and the like may all be varied within the scope of the invention. Thus, the present invention shall only be construed in accordance with the following claims:

The invention that is claimed is:

1. A high efficiency liquid filtration system comprising:

a primary housing comprising at least one inlet port therein;

a plurality of elongate filter cartridge units positioned within said housing, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a plurality of tubular shaft members, each of said shaft members being connected to one of said cartridge units and comprising an open first end, a closed second end, and a medial portion between said first end and said second end, said medial portion comprising a tubular outer wall and an internal passageway therein surrounded by said outer wall, said outer wall further comprising at least one port therethrough between said first end and said second end of each of said shaft members, said port providing access to said internal passageway, said first end of each of said shaft members terminating at, and being connected to said upper end of one of said cartridge units; and drive means operatively connected to said second end of each of said shaft members and positioned outside of said primary housing for simultaneously rotating each of said cartridge units around said longitudinal axis thereof, said second end of each of said shaft members being positioned outside of and above said primary housing so that said second end of each of said shaft members may be operatively connected to said drive means, said rotating of said cartridge units by said drive means causing said cartridge units to filter solid materials from said fluid materials with increased efficiency.

2. The liquid filtration system of claim 1 wherein any one of said cartridge units is separated from an adjacent one of said cartridge units by a distance not less than about 0.1 inch.

3. The liquid filtration system of claim 1 wherein said drive means comprises:

a plurality of annular pulley members, each of said pulley members being attached to said second end of one of said shaft members;

a continuous belt member operatively connected to and in simultaneous engagement with all of said annular pulley members; and motor means operatively connected to said belt member in order to cause said belt member to move and thereby cause corresponding movement of said annular pulley members and said shaft members attached thereto.

4. A high efficiency liquid filtration system comprising:

a primary housing comprising at least one inlet port therein;

a plurality of elongate filter cartridge units positioned within said housing, each of said cartridge units comprising:

a longitudinal axis;

a tubular side wall portion comprised of filter material;

an interior region therein surrounded by said side wall portion; and a core member positioned within said interior region, said core member comprising a medial section, said medial section comprising a first end and a second end, said core member further comprise an upper cap member secured to said first end, and a lower cap member secured to said second end, said upper cap member comprising an upper end having an opening therein and a closed lower end opposing said upper end, said opening extending downwardly from said upper end only through a portion of said upper cap member, and terminating in at least one longitudinal bore passing therethrough, said bore being perpendicular to and in fluid communication with said opening in said upper cap member, said side wall portion of each of said cartridge units comprising an upper end and a lower end, said upper cap member of said core member being fixedly secured to said upper end of said side wall portion and said lower cap member of said core member being fixedly secured to said lower end of said side wall portion so that said medial section of said core member is positioned entirely within said interior region in said side wall portion, said medial section of said core member being spaced inwardly from said side wall portion in order to form a fluid flow passageway therebetween, said fluid flow passageway being in fluid communication with said bore in said upper cap member so that fluid materials which pass through said filter material of said side wall portion travel through said passageway, pass through said bore in said upper cap member, and thereafter pass through said opening in said upper cap member; and drive means operatively connected to all of said cartridge units for simultaneously rotating each of said cartridge units around said longitudinal axis thereof, said rotating of said cartridge units by said drive means causing said cartridge units to filter solid materials from said fluid materials with increased efficiency.

5. A high efficiency liquid filtration system comprising:

a primary housing comprising at least one inlet port therein;

a plurality of elongate filter cartridge units positioned within said housing, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a cartridge unit support member positioned within said primary housing comprising a planar upper surface comprising a plurality of openings therein, each of said openings extending partially through said support member and comprising a biasing member positioned therein and a bearing member positioned on top of said biasing member, said bearing member being positioned adjacent to and in contact with said lower end of one of said cartridge units so that said one of said cartridge units is freely rotatable on said bearing member;

a plurality of tubular shaft members, each of said shaft members being connected to one of said cartridge units and comprising an open first end, a closed second end, and a medial portion between said first end and said second end, said medial portion comprising a tubular outer wall and an internal passageway therein surrounded by said outer wall, said outer wall further comprising at least one port therethrough between said first end and said second end of each of said shaft members, said port providing access to said internal passageway, said first end of each of said shaft members being connected to said upper end of one of said cartridge units; and drive means operatively connected to said second end of each of said shaft members for simultaneously rotating each of said cartridge units around said longitudinal axis thereof, said rotating of said cartridge units by said drive means causing said cartridge units to filter solid materials from said fluid materials with increased efficiency.

6. The liquid filtration system of claim 5 further comprising a secondary housing attached to said primary housing, said secondary housing comprising a longitudinal axis and a plurality of main bores therethrough, each of said main bores being parallel to said longitudinal axis of said secondary housing and each of said shaft members being positioned within one of said main bores in said secondary housing, said secondary housing further comprising a plurality of fluid delivery passageways therethrough, each of said fluid delivery passageways being perpendicular to said longitudinal axis of said secondary housing and in fluid communication with one of said main bores in said secondary housing, each of said fluid delivery passageways also being in fluid communication with a fluid collection bore which extends through said secondary housing in a direction parallel to said longitudinal axis of said secondary housing, said fluid collection bore being remotely spaced from said main bores through said secondary housing.

7. The liquid filtration system of claim 5 wherein any one of said cartridge units is separated from an adjacent one of said cartridge units by a distance not less than about 0.1 inch.

8. The liquid filtration system of claim 5 wherein said plurality of cartridge units comprises three individual cartridge units positioned within said primary housing in a triangular arrangement in which each of said three individual cartridge units is spaced equidistantly from each other.

9. The liquid filtration system of claim 8 wherein said three individual cartridge units are spaced equidistantly from each other by a distance not less than about 0.1 inch.

10. The liquid filtration system of claim 5 wherein said drive means comprises:

a plurality of annular pulley members, each of said pulley members being attached to said second end of one of said shaft members;

a continuous belt member operatively connected to and in simultaneous engagement with all of said annular pulley members; and motor means operatively connected to said belt member in order to cause said belt member to move and thereby cause corresponding movement of said annular pulley members and said shaft members attached thereto.

11. A high efficiency liquid filtration system comprising:

a primary housing comprising at least one inlet port therein;

three individual elongate filter cartridge units positioned within said housing in a triangular arrangement in which each of said cartridge units is spaced equidistantly from each other, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

three tubular shaft members, each of said shaft members being connected to one of said cartridge units and comprising an open first end, a closed second end, and a medial portion between said first end and said second end, said medial portion comprising a tubular outer wall and an internal passageway therein surrounded by said outer wall, said outer wall further comprising at least one port therethrough between said first end and said second end of each of said shaft members, said port providing access to said internal passageway, said first end of each of said shaft members terminating at, and being connected to said upper end of one of said cartridge units; and drive means operatively connected to said second end of each of said shaft members and positioned outside of said primary housing for simultaneously rotating each of said cartridge units around said longitudinal axis thereof, said second end of each of said shaft members being positioned outside of and above said primary housing so that said second end of each of said shaft members may be operatively connected to said drive means, said rotating of said cartridge units causing said cartridge units to filter solid materials from said fluid materials with increased efficiency.

12. The liquid filtration system of claim 11 wherein said drive means comprises:

three annular pulley members, each of said pulley members being attached to said second end of one of said shaft members;

a continuous belt member operatively connected to and in simultaneous engagement with all of said annular pulley members; and motor means operatively connected to said belt member in order to cause said belt member to move and thereby cause corresponding movement of said annular pulley members and said shaft members attached thereto.

13. The liquid filtration system of claim 11 further comprising a secondary housing attached to said primary housing, said secondary housing comprising a longitudinal axis and three main bores therethrough, each of said main bores being parallel to said longitudinal axis of said secondary housing and each of said shaft members being positioned within one of said main bores in said secondary housing, said secondary housing further comprising three fluid delivery passageways therethrough, each of said fluid delivery passageways being perpendicular to said longitudinal axis of said secondary housing and in fluid communication with one of said main bores in said secondary housing, each of said fluid delivery passageways also being in fluid communication with a fluid collection bore which extends through said secondary housing in a direction parallel to said longitudinal axis of said secondary housing, said fluid collection bore being remotely spaced from said main bores through said secondary housing.

14. A high efficiency liquid filtration system comprising:

a primary housing comprising at least one inlet port therein;

three individual elongate filter cartridge units positioned within said housing in a triangular arrangement in which each of said cartridge units is spaced equidistantly from each other, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a cartridge unit support member comprising a planar upper surface comprising three openings therein, each of said openings extending partially through said support member and comprising a biasing member positioned therein and a bearing member positioned on top of said biasing member, said bearing member being positioned adjacent to and in contact with said lower end of one of said cartridge units so that said one of said cartridge units is freely rotatable on said bearing member, said cartridge unit support member further comprising a plurality of drainage bores therein, each of said drainage bores passing entirely through said support member;

three tubular shaft members, each of said shaft members being connected to one of said cartridge units and comprising an open first end, a closed second end, and a medial portion between said first end and said second end, said medial portion comprising a tubular outer wall and an internal passageway therein surrounded by said outer wall, said outer wall further comprising at least one port therethrough between said first end and said second end of each of said shaft members, said port providing access to said internal passageway, said first end of each of said shaft members being connected to said upper end of one of said cartridge units;

a secondary housing attached to said primary housing, said secondary housing comprising a longitudinal axis and three main bores therethrough, each of said main bores being parallel to said longitudinal axis of said secondary housing and each of said shaft members being positioned within one of said main bores in said secondary housing, said secondary housing further comprising three fluid delivery passageways therethrough, each of said fluid delivery passageways being,perpendicular to said longitudinal axis of said secondary housing and in fluid communication with one of said main bores in said secondary housing, each of said fluid delivery passageways also being in fluid communication with a fluid collection bore which extends through said secondary housing in a direction parallel to said longitudinal axis of said secondary housing, said fluid collection bore being remotely spaced from said main bores through said secondary housing; and drive means operatively connected to said second end of each of said shaft members for simultaneously rotating each of said cartridge units around said longitudinal axis thereof, said rotating of said cartridge units causing said cartridge units to filter solid materials from said fluid materials with increased efficiency, said drive means comprising:

three annular pulley members, each of said pulley members being attached to said second end of one of said shaft members;

a continuous belt member operatively connected to and in simultaneous engagement with all of said annular pulley members; and motor means operatively connected to said belt member in order to cause said belt member to move and thereby cause corresponding movement of said annular pulley members and said shaft members attached thereto.

15. The liquid filtration system of claim 14 wherein each of said cartridge units further comprises a core member positioned within said interior region, said core member comprising a medial section, said medial section comprising a first end, a second end, an upper cap member secured to said first end of said medial section, and a lower cap member secured to said second end of said medial section, said upper cap member comprising an elongate opening therein, said elongate opening extending downwardly through at least a portion of said upper cap member, said upper cap member further comprising at lease one longitudinal bore passing therethrough, said longitudinal bore being perpendicular to and in fluid communication with said elongate opening, said side wall portion of each of said cartridge units comprising an upper end and a lower end, said upper cap member of said core member being fixedly secured to said upper end of said side wall portion and said lower cap member of said core member being fixedly secured to said lower end of said side wall portion so that said medial section of said core member is positioned entirely within said interior region in said side wall portion, said medial section of said core member being spaced inwardly from said side wall portion in order to form a fluid flow passageway therebetween, said fluid flow passageway being in fluid communication with said longitudinal bore in said upper cap member so that fluid materials which pass through said filter material of said side wall portion travel through said fluid flow passageway, pass through said longitudinal bore in said upper cap member, and thereafter pass through said elongate opening in said upper cap member.

16. A high efficiency liquid filtration system comprising:

a primary housing comprising at least one inlet port therein;

a plurality of elongate filter cartridge units positioned within said housing, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a cartridge unit support member positioned within said primary housing comprising a planar upper surface, said planar upper surface comprising a plurality of openings therein, each of said openings extending partially through said support member and comprising a biasing member positioned therein and a bearing member positioned on top of said biasing member, said bearing member being positioned adjacent to and in contact with said lower end of one of said cartridge units so that said one of said cartridge units is freely rotatable on said bearing member; and drive means operatively connected to all of said cartridge units for simultaneously rotating each of said cartridge units around said longitudinal axis thereof, said rotating of said cartridge units by said drive means causing said cartridge units to filter solid materials from said fluid materials with increased efficiency.

17. The liquid filtration system of claim 16 wherein said cartridge unit support member further comprises a plurality of drainage bores therein, each of said drainage bores passing entirely through said support member.

18. A high efficiency liquid filtration system comprising:

a primary housing comprising at least one inlet port therein;

a plurality of elongate filter cartridge units positioned within said housing, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a plurality of tubular shaft members, each of said shaft members being connected to one of said cartridge units and comprising an open first end, a closed second end, and a medial portion between said first end and said second end, said medial portion comprising a tubular outer wall and an internal passageway therein surrounded by said outer wall, said outer wall further comprising at least one port therethrough between said first end and said second end of each of said shaft members, said port providing access to said internal passageway, said first end of each of said shaft members terminating at, and being connected to said upper end of one of said cartridge units;

a secondary housing attached to said primary housing, said secondary housing comprising a longitudinal axis and a plurality of main bores therethrough, each of said main bores being parallel to said longitudinal axis of said secondary housing and each of said shaft members being positioned within one of said main bores in said secondary housing, said secondary housing further comprising a plurality of fluid delivery passageways therethrough, each of said fluid delivery passageways being perpendicular to said longitudinal axis of said secondary housing and in fluid communication with one of said main bores in said secondary housing, each of said fluid delivery passageways also being in fluid communication with a fluid collection bore which extends through said secondary housing in a direction parallel to said longitudinal axis of said secondary housing, said fluid collection bore being remotely spaced from said main bores through said secondary housing; and drive means operatively connected to said second end of each of said shaft members and positioned outside of said primary housing and said secondary housing for simultaneously rotating each of said cartridge units around said longitudinal axis thereof, said second end of each of said shaft members being positioned outside of and above said primary housing and said secondary housing that said second end of each of said shaft members may be operatively connected to said drive means, said rotating of said cartridge units by said drive means causing said cartridge units to filter solid materials from said fluid materials with increased efficiency.

19. A high efficiency liquid filtration system comprising:

a primary housing comprising at least one inlet port therein;

three individual elongate filter cartridge units positioned within said housing in a triangular arrangement in which each of said cartridge units is spaced equidistantly from each other, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom;

a cartridge unit support member positioned within said primary housing comprising a planar upper surface, said planar upper surface comprising three openings therein, each of said openings extending partially through said support member and comprising a biasing member positioned therein and a bearing member positioned on top of said biasing member, said bearing member being positioned adjacent to and in contact with said lower end of one of said cartridge units so that said one of said cartridge units is freely rotatable on said bearing member; and drive means operatively connected to all of said cartridge units for simultaneously rotating each of said cartridge units around said longitudinal axis thereof, said rotating of said cartridge units by said drive means causing said cartridge units to filter solid materials from said fluid materials with increased efficiency.

20. A high efficiency liquid filtration system comprising:

a primary housing comprising at least one inlet port therein;

three individual elongate filter cartridge units positioned within said housing in a triangular arrangement in which each of said cartridge units is spaced equidistantly from each other, each of said cartridge units comprising a longitudinal axis, an upper end, a closed lower end, a tubular side wall portion comprised of filter material, and an interior region therein surrounded by said side wall portion for receiving fluid materials which pass through said side wall portion, each of said cartridge units being rotatable around said longitudinal axis thereof and further comprising at least one outlet at said upper end for allowing said fluid materials within said interior region to pass outwardly therefrom, each of said cartridge units further comprising a core member positioned within said interior region, said core member comprising a medial section, said medial section comprising a first end and a second end, said core member further comprising an upper cap member secured to said first end, and a lower cap member secured to said second end, said upper cap member comprising an upper end having an opening therein and a closed lower end opposing said upper end of said upper cap member, said opening extending downwardly from said upper end of said upper cap member only through a portion of said upper cap member and terminating in at least one longitudinal bore passing therethrough, said bore being perpendicular to and in fluid communication with said opening, said side wall portion of each of said cartridge units comprising an upper end and a lower end, said upper cap member of said core member being fixedly secured to said upper end of said side wall portion and said lower cap member of said core member being fixedly secured to said lower end of said side wall portion so that said medial section of said core member is positioned entirely within said interior region in said side wall portion, said medial section of said core member being spaced inwardly from said side wall portion in order to form a fluid flow passageway therebetween, said fluid flow passageway being in fluid communication with said bore in said upper cap member so that fluid materials which pass through said filter material of said side wall portion travel through said passageway, pass through said bore in said upper cap member, and thereafter pass through said opening in said upper cap member; and drive means operatively connected to all of said cartridge units for simultaneously rotating each of said cartridge units around said longitudinal axis thereof, said rotating of said cartridge units by said drive means causing said cartridge units to filter solid materials from said fluid materials with increased efficiency.

* * * * *